(12) United States Patent
Yamahata et al.

(10) Patent No.: US 9,052,860 B2
(45) Date of Patent: Jun. 9, 2015

(54) IMAGE FORMING APPARATUS, COMPUTER-READABLE STORAGE MEDIUM FOR COMPUTER PROGRAM, AND CONTROL METHOD THEREOF

(75) Inventors: Taketoshi Yamahata, Toyokawa (JP); Tsumoru Matsuura, Toyohashi (JP); Eiichi Yoshida, Toyokawa (JP); Takatsugu Kuno, Toyokawa (JP); Kenichi Komaba, Toyokawa (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 0 days.

(21) Appl. No.: 12/859,809

(22) Filed: Aug. 20, 2010

(65) Prior Publication Data

US 2011/0051158 A1    Mar. 3, 2011

(30) Foreign Application Priority Data

Aug. 25, 2009   (JP) ................................. 2009-193797

(51) Int. Cl.
*G06K 15/00*   (2006.01)
*G06F 3/12*    (2006.01)
(Continued)

(52) U.S. Cl.
CPC ............ *G06F 3/1285* (2013.01); *G06F 3/1204* (2013.01); *G06F 3/1222* (2013.01);
(Continued)

(58) Field of Classification Search
USPC ........ 358/1.9, 3.23, 3.02, 3.1, 3.12, 520, 518, 358/523, 537, 442, 444, 1.16
See application file for complete search history.

(56) References Cited

U.S. PATENT DOCUMENTS 3,940,746 A * 2/1976 Vittorelli ............................ 400/5
5,400,243 A * 3/1995 Oheda et al. .................. 715/247
(Continued)

FOREIGN PATENT DOCUMENTS

JP    02-255973 A    10/1990
JP    05-210673 A    8/1993
(Continued)

OTHER PUBLICATIONS

Extended European Search Report issued Dec. 27, 2011, in corresponding European Patent Application No. 10173824.3.
(Continued)

*Primary Examiner* — Madelein A Nguyen
(74) *Attorney, Agent, or Firm* — Buchanan Ingersoll & Rooney PC

(57) ABSTRACT

An image forming apparatus that prints and edits a document includes a user identification portion, a print management portion that records print management information indicating a user who performs abort operation of printing, an edit management portion that records edit management information, a determination portion that determines, based on the print management information, whether or not the user is a print suspended operator who has performed the abort operation previously, a page extraction portion that, when the print suspended operator performs reprinting operation for giving instructions to print the document that has been updated, extracts pages of the document which were printed successfully when printing of the document was suspended and have been updated thereafter, and a print controller that controls the image forming apparatus such that the image forming apparatus prints at least unprinted pages of the document and the pages extracted by the page extraction portion.

16 Claims, 23 Drawing Sheets

(51) Int. Cl.
*H04N 1/46* (2006.01)
*G03G 15/00* (2006.01)

(52) U.S. Cl.
CPC ............ *G06F3/1234* (2013.01); *G06F 3/1239* (2013.01); *G06F 3/1258* (2013.01); *G03G 15/502* (2013.01); *G03G 2215/00109* (2013.01); *G03G 15/5091* (2013.01)
USPC .......................... 358/1.16; 358/537; 358/1.13

(56) References Cited

U.S. PATENT DOCUMENTS

| | | | |
|---|---|---|---|
| 5,625,757 A * | 4/1997 | Kageyama et al. | 358/1.14 |
| 5,923,013 A * | 7/1999 | Suzuki et al. | 235/375 |
| 6,115,132 A * | 9/2000 | Nakatsuma et al. | 358/1.14 |
| 6,292,267 B1 * | 9/2001 | Mori et al. | 358/1.15 |
| 6,466,935 B1 * | 10/2002 | Stuart | 1/1 |
| 6,567,180 B1 * | 5/2003 | Kageyama et al. | 358/1.15 |
| 6,707,563 B1 * | 3/2004 | Barry et al. | 358/1.14 |
| 6,816,179 B2 * | 11/2004 | Hanyu | 347/131 |
| 6,834,926 B2 * | 12/2004 | Shibata | 347/15 |
| 6,853,464 B1 * | 2/2005 | Ueda et al. | 358/1.9 |
| 7,298,525 B2 * | 11/2007 | Hagai et al. | 358/1.9 |
| 7,339,698 B1 * | 3/2008 | Ohta | 358/1.9 |
| 7,393,070 B2 * | 7/2008 | Arazaki | 347/5 |
| 7,406,388 B2 * | 7/2008 | Casto et al. | 702/85 |
| 7,499,198 B2 * | 3/2009 | Hirano | 358/3.14 |
| 7,520,583 B2 * | 4/2009 | Arazaki et al. | 347/15 |
| 7,561,289 B2 * | 7/2009 | Talley et al. | 358/1.15 |
| 7,564,591 B1 * | 7/2009 | Takahashi et al. | 358/3.21 |
| 7,690,748 B2 * | 4/2010 | Lapstun et al. | 347/15 |
| 7,839,518 B2 * | 11/2010 | Gomi | 358/1.15 |
| 8,154,769 B2 * | 4/2012 | Mcfarland et al. | 358/1.16 |
| 2001/0055123 A1 * | 12/2001 | Ryan et al. | 358/1.12 |
| 2002/0080387 A1 * | 6/2002 | Grasso et al. | 358/1.15 |
| 2002/0105557 A1 * | 8/2002 | Teshigawara et al. | 347/15 |
| 2002/0154182 A1 * | 10/2002 | Takahashi et al. | 347/12 |
| 2003/0053114 A1 * | 3/2003 | Nishikawa et al. | 358/1.14 |
| 2003/0137556 A1 * | 7/2003 | Nunokawa | 347/43 |
| 2003/0151773 A1 * | 8/2003 | Ogawa et al. | 358/3.03 |
| 2003/0169455 A1 * | 9/2003 | Takahashi et al. | 358/3.03 |
| 2003/0179262 A1 * | 9/2003 | Nishikori et al. | 347/43 |
| 2003/0202213 A1 * | 10/2003 | Saito | 358/1.18 |
| 2003/0223795 A1 * | 12/2003 | Gomi | 400/61 |
| 2004/0109191 A1 * | 6/2004 | Ohshima | 358/1.13 |
| 2004/0179230 A1 * | 9/2004 | Kitada et al. | 358/1.15 |
| 2004/0184107 A1 * | 9/2004 | Iino et al. | 358/2.1 |
| 2005/0117948 A1 * | 6/2005 | Hatta et al. | 400/62 |
| 2005/0131907 A1 * | 6/2005 | Matsuzawa et al. | 707/10 |
| 2005/0141022 A1 * | 6/2005 | Aiyama | 358/1.15 |
| 2005/0168767 A1 * | 8/2005 | Moroney et al. | 358/1.14 |
| 2005/0200900 A1 * | 9/2005 | Hirano | 358/3.06 |
| 2005/0200905 A1 * | 9/2005 | Kimura | 358/3.27 |
| 2005/0243365 A1 * | 11/2005 | Noda | 358/1.15 |
| 2006/0077415 A1 * | 4/2006 | Bhattacharjya et al. | 358/1.14 |
| 2007/0103715 A1 * | 5/2007 | Nakata | 358/1.14 |
| 2007/0121164 A1 | 5/2007 | Ii | |
| 2007/0127064 A1 * | 6/2007 | Kuroshima | 358/1.15 |
| 2007/0146791 A1 * | 6/2007 | Murase | 358/1.16 |
| 2007/0201091 A1 * | 8/2007 | Tanaka | 358/1.16 |
| 2007/0206212 A1 * | 9/2007 | Ohno | 358/1.14 |
| 2007/0263246 A1 * | 11/2007 | Bressan et al. | 358/1.15 |
| 2008/0055622 A1 | 3/2008 | Reuvers et al. | |
| 2008/0144100 A1 * | 6/2008 | Tomii et al. | 358/1.15 |
| 2008/0218798 A1 | 9/2008 | Shigehisa et al. | |
| 2008/0239361 A1 | 10/2008 | Nagami | |
| 2008/0292353 A1 | 11/2008 | Sato | |
| 2008/0304104 A1 | 12/2008 | Hirama | |
| 2009/0006422 A1 * | 1/2009 | Matsuzawa et al. | 707/10 |
| 2009/0033968 A1 * | 2/2009 | Lapstun et al. | 358/1.9 |
| 2009/0037473 A1 | 2/2009 | Hiraguchi | |
| 2009/0109498 A1 * | 4/2009 | Barclay et al. | 358/474 |
| 2009/0116052 A1 * | 5/2009 | Matsuzawa | 358/1.14 |
| 2009/0147310 A1 * | 6/2009 | Tsunekawa | 358/1.15 |
| 2009/0204607 A1 * | 8/2009 | Matsuzawa | 707/5 |
| 2009/0316199 A1 * | 12/2009 | Yoshimura et al. | 358/1.15 |
| 2010/0114515 A1 * | 5/2010 | Casto et al. | 702/85 |
| 2010/0174615 A1 * | 7/2010 | Weaver | 705/26 |
| 2010/0202016 A1 * | 8/2010 | Matsuzawa | 358/1.15 |
| 2011/0026065 A1 * | 2/2011 | Bard et al. | 358/1.14 |
| 2011/0099251 A1 * | 4/2011 | Tsukada et al. | 709/219 |
| 2012/0019866 A1 * | 1/2012 | Kuroshima | 358/1.15 |

FOREIGN PATENT DOCUMENTS

| | | |
|---|---|---|
| JP | 2003-223087 A | 8/2003 |
| JP | 2006-035533 A | 2/2006 |
| JP | 2006-198901 A | 8/2006 |
| JP | 2007-069534 A | 3/2007 |
| JP | 2008-158194 A | 7/2008 |
| JP | 2008-219802 A | 9/2008 |
| JP | 2008-242790 A | 10/2008 |
| JP | 2008-306528 A | 12/2008 |
| JP | 2009-033673 A | 2/2009 |

OTHER PUBLICATIONS

Decision to Grant a Patent issued on Aug. 16, 2011, in corresponding Japanese Patent Application No. 2009-193797, with a verified English translation thereof.
Office Action issued in corresponding European Patent Application No. 10173824.3, dated Feb. 21, 2014.

* cited by examiner

FIG. 3

T1 USER MANAGEMENT TABLE

| No. | USER NAME | PASSWORD | SUSPENDED BOX NAME | PRINT SUSPENDED DOCUMENT NAME |
|---|---|---|---|---|
| 1 | yamada | password1 | A | DOCUMENT A |
|   |        |           | A | DOCUMENT B |
| 2 | kimura | password2 | A | DOCUMENT A |
|   |        |           | A | DOCUMENT B |
| 3 | sato | password3 |   |   |
| 4 | suzuki | password4 |   |   |
| 5 | takeda | password5 |   |   |
| 6 | matsui | password6 |   |   |
| 7 | kataoka | password7 | A | DOCUMENT A |
| ⋮ | ⋮ | ⋮ | ⋮ | ⋮ |

FIG. 4

T2 DOCUMENT MANAGEMENT TABLE

| No. | DOCUMENT NAME | NUMBER OF PAGES | 70 PRINT SUSPENDED OPERATOR | PRINT SUSPENDED PAGE | TOTAL NO. OF PRINT FLAG | PRINT SUSPENDED TIME | 75 EDIT FLAG | PRINTED AND EDITED PAGE |
|---|---|---|---|---|---|---|---|---|
| 1 | DOCUMENT A | 5 | 1 | - | FALSE | - | FALSE | - |
|   |            |   | 2 | 4 | TRUE | 2009/6/15 10:42 | TRUE | 2,4 |
|   |            |   | 7 | - | FALSE | - | FALSE | - |
| 2 | DOCUMENT B | 10 | 1 | 4 | TRUE | 2009/6/30 14:58 | FALSE | - |
|   |            |    | 2 | 3 | FALSE | - | FALSE | - |
|   |            |    |   |   |       |   |       |   |
| ⋮ | ⋮ | ⋮ | ⋮ | ⋮ | ⋮ | ⋮ | ⋮ | ⋮ |

FIG. 22

DOCUMENT MANAGEMENT TABLE

T2b

| No. | DOCUMENT NAME | NUMBER OF PAGES | DOCUMENT DELETION RESERVED FLAG | DOCUMENT PRINT SUSPENDED OPERATOR | PRINT SUSPENDED PAGE | TOTAL NUMBER OF PAGES PRINT FLAG | PRINT SUSPENDED TIME | EDIT FLAG | PRINTED AND EDITED PAGE |
|---|---|---|---|---|---|---|---|---|---|
| 1 | DOCUMENT A | 5 | FALSE | 1 | - | FALSE | - | FALSE | - |
|   |            |   |       | 2 | 4 | TRUE  | 2009/6/15 10:42 | TRUE | 2 |
|   |            |   |       | 7 | - | FALSE | - | FALSE | - |
| 2 | DOCUMENT B | 10 | TRUE | 1 | 4 | TRUE  | 2009/6/30 14:58 | FALSE | - |
|   |            |   |      | 2 | 3 | FALSE | - | FALSE | - |
|   |            |   |      |   |   |       |   |   |   |
| ⋮ | ⋮ | ⋮ | ⋮ | ⋮ | ⋮ | ⋮ | ⋮ | ⋮ | ⋮ |

Columns 69, 70, 75 group headers span: 69 = NUMBER OF PAGES/DOCUMENT DELETION RESERVED FLAG area; 70 = DOCUMENT PRINT SUSPENDED OPERATOR through PRINT SUSPENDED TIME; 75 = EDIT FLAG / PRINTED AND EDITED PAGE.

IMAGE FORMING APPARATUS, COMPUTER-READABLE STORAGE MEDIUM FOR COMPUTER PROGRAM, AND CONTROL METHOD THEREOF

This application is based on Japanese Patent Application No. 2009-193797 filed on Aug. 25, 2009, the contents of which are hereby incorporated by reference.

BACKGROUND OF THE INVENTION

1. Field of the Invention

The present invention relates to an image forming apparatus having a document editing function, a computer-readable storage medium storing a computer program for the image forming apparatus, and a control method for controlling the image forming apparatus.

2. Description of the Related Art

Multifunction devices are one example of information equipment that is used for business purposes and called Office Automation (OA) equipment. Such multifunction devices have recently been known as Multi-Function Peripherals (MFPs) providing functions such as image inputting, fax communication, electronic mail communication, document storage in addition to a basic function as an image forming apparatus such as copying and printing. Such multifunction devices are connected to networks of business offices, and operate in response to input operation through an operational panel provided in the multifunction device or in response to access from computers connected to the networks.

Many of such multifunction devices have a security function for authenticating users. According to a typical authentication method, a multifunction device verifies a user ID and password entered by a user for using the device against user IDs and passwords registered in advance. When the verification is successful, then the user is authenticated. The authenticated user is allowed to provide a variety of jobs such as a print job to the multifunction device.

During the execution of a print job, the multifunction device automatically suspends the execution of the print job when it encounters such a trouble as paper shortage or paper jams, or an interruption of another job. If power is kept turned on during the suspension, the print job is maintained. When the trouble is cleared or the interruption of another job completes, the suspended print job is resumed, and remaining unprinted pages will be printed.

With regard to the suspension of a print job, JP-2008-158194A proposes a technique to hold a print job even if power is shut off. According to the technique, a job in execution and the job information indicating the progress of the job in execution are stored in a non-volatile memory. When power is restarted after shut-off, the job information is read from the non-volatile memory and loaded into a volatile memory (RAM) used for control, and the suspended job is resumed.

JP-2006-35533A also proposes another technique in which a "Suspend/End" key and a "Reprint" key are provided on an operation panel of a printer. When the "Suspend/End" key is pressed during printing, the printer stops paper feeding operation and stores data that is mapped in a page buffer into a non-volatile memory. When the "Reprint" key is pressed, the printer reads the data from the non-volatile memory and prints the data.

The multifunction device is provided with a box used for storing and temporarily storing documents. The box is a non-volatile memory area provided in a large-capacity storage device such as a hard disk drive (HDD). The box may be provided for each user or each user group, or provided in such a way that it can be accessed by all users. Documents that are stored in the box are printed, transmitted by fax, transmitted to another device via a network, edited, or deleted according to individual jobs.

JP-2008-219802A proposes a technique intended to share information among a plurality of users with respect to editing and deletion of documents stored in a box. According to this technique, when a user performs operation to edit or delete a document stored in a box shared by a plurality of users, the apparatus determines whether all the plurality of users have accessed the document before it is edited. The unedited document is stored until all the plurality of users access the document. After all the plurality of users have accessed the document, an edited document is made available for access in place of the unedited document. When a user performs deletion of the document, the document is deleted when all the plurality of users have accessed the document.

In printing a document that is stored in a box and shared by a plurality of users, there are some cases where a print job is canceled while it is still executed. This is particularly a possible case for printing a document having a large number of pages. In such a case, it may be possible that a user has no choice but to determine to cancel the printing while it is still executed and to perform job canceling operation. For example, the job is canceled in such a case when the user must leave the multifunction device unattended for such a reason as for attending a meeting or an urgent matter to attend before the completion of printing. In that case, the user can not collect all printed paper (printed matter) in a short period of time and cancels the job. The job may also be canceled in a case where the user is unable to continue the intended printing if paper runs out and no replenishing stock is available. The user can leave the multifunction device unattended without canceling the printing. However, such a decision leaves the printed sheets of paper unattended, which impairs the security of information. Alternatively, if the user suspends the printing and allows the multifunction device to hold the job, other print jobs can not be executed, causing troubles to other users.

Cancellation of the print job entails cancellation of print data bitmapped from a document and job management information indicating progress of a job execution such as completed pages. This means that a new print job should be provided to the multifunction device if the same document is to be printed.

When a print job is provided, a user specifies pages to be printed as required. When a document whose printing has been discontinued by cancellation is reprinted, the user who wishes to print only those pages that remain unprinted is required to check the printed pages to find unprinted pages in order to specify the pages to be printed. This requires the user to do a laborious work. It may be possible for the user to specify all pages to skip the laborious work. In that case, however, pages that have been already printed will be printed again, leading to a waste of paper unnecessarily.

In addition, during a period from when a user suspended printing of a document until the user prints the document again, some other users may perform file editing by partially altering the same document. This means that the data of pages that had been printed before suspending the printing may be changed. In this case, the user who suspended the printing, when he or she provides an instruction for printing again, can specify all pages to obtain an updated printed matter. However, if the user, without knowing that file editing has been performed, specifies the unprinted pages for printing, there may be inconsistency between the pages that were already printed and the pages to be printed depending on how the file editing has been performed.

SUMMARY OF THE INVENTION

In view of the problems describe above, it is an object of the present invention to realize printing operation, when a document is printed, for automatically selecting pages to be printed according to whether or not printing of the document was suspended and whether or not the document has been edited after the suspension of the printing.

According to one aspect of the present invention, an image forming apparatus, which has a storage area for storing a document therein, and prints and edits the document stored in the storage area, includes: a user identification portion that identifies a user who operates the image forming apparatus; a print management portion that, when abort operation for giving instructions to suspend printing is performed while the document is being printed, records print management information indicating unprinted pages, and a user who performs the abort operation and is identified by the user identification portion; an edit management portion that, when the document is updated according to edit operation, records edit management information indicating an updated page; a determination portion that determines, based on the print management information, whether or not the user who is identified by the user identification portion is a print suspended operator who has performed the abort operation previously a page extraction portion that, when the print suspended operator performs reprinting operation for giving instructions to print the document that has been updated, refers to the print management information and the edit management information and extracts pages of the document which were printed successfully when printing of the document was suspended and, at the same time, which have been updated thereafter; and a print controller that controls the image forming apparatus such that the image forming apparatus prints, in response to the reprinting operation, at least unprinted pages of the document and the pages extracted by the page extraction portion.

These and other characteristics and objects of the present invention will become more apparent by the following descriptions of preferred embodiments with reference to drawings.

BRIEF DESCRIPTION OF THE DRAWINGS

FIG. 3 is a diagram illustrating an example of a configuration of a user management table.

FIG. 4 is a diagram illustrating an example of a configuration of a document management table.

FIG. 22 is a diagram illustrating an example of another configuration of a document management table.

DESCRIPTION OF THE PREFERRED EMBODIMENTS

A multifunction device (MFP) is taken, hereinafter, as an example of an image forming apparatus that prints document onto recording paper. The multifunction device taken as an example includes an editing function for updating document data stored in a box. A user of the multifunction device causes the multifunction device to perform a print job and edit job by way of operation on an operation panel provided in the multifunction device or remote operation through a network.

Figure 1:
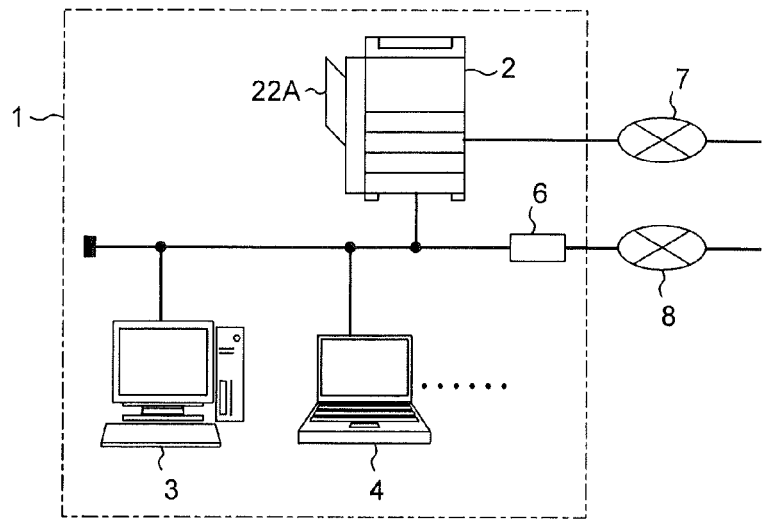
FIG. 1 is a diagram illustrating an example of a network configuration including a multifunction device according to an embodiment of the present invention.

Referring to FIG. 1, a multifunction device 2 is included in an information processing system 1. The information processing system 1 also includes a Local Area Network (LAN) provided in business offices or offices of a similar organization. The LAN is connected to a public line 7 through the multifunction device 2 and to the Internet 8 through a router 6. In the information processing system 1, the multifunction device 2 and a plurality of personal computers 3 and 4 can communicate with each other. Further, the personal computers 3 and 4 can access the multifunction device 2 by using Web tools including Web applications.

Figure 2:
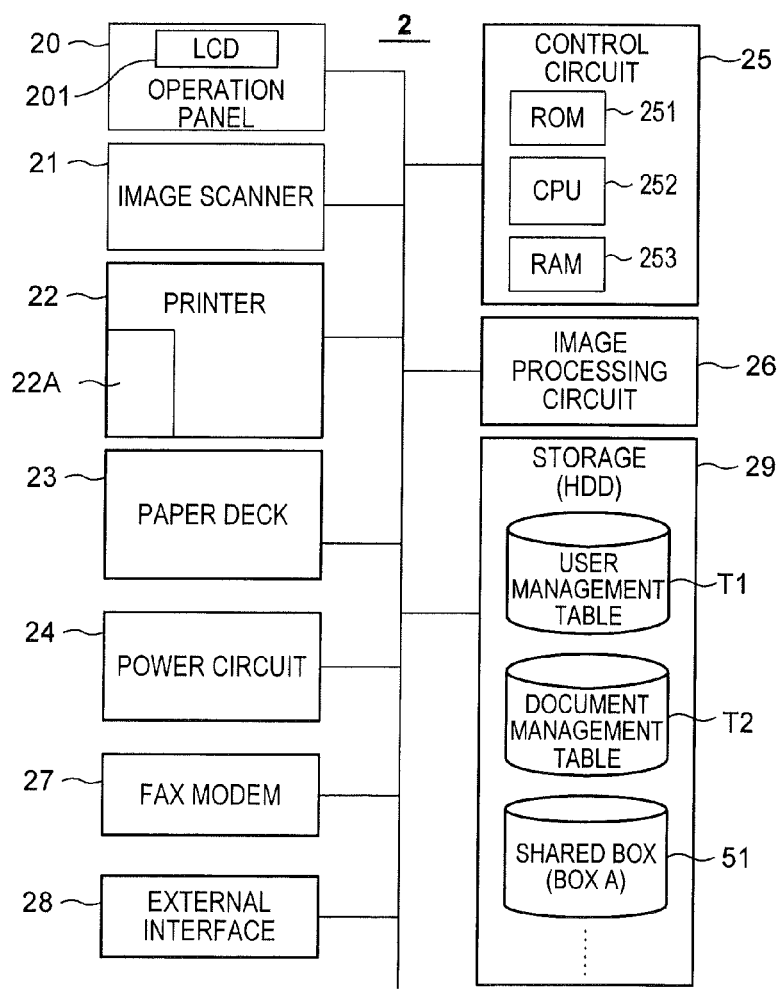
FIG. 2 is a block diagram illustrating a hardware configuration of the multifunction device.

FIG. 2 illustrates a hardware configuration of the multifunction device 2. The multifunction device 2 is provided with an operation panel 20, an image scanner 21, a printer 22, a paper deck 23, a power circuit 24, a control circuit 25, an image processing circuit 26, a facsimile communication modem 27, an external interface 28, and a storage 29. The operation panel 20 is provided with a Liquid Crystal Display (LCD) as a display 201 for displaying an operation screen. A touch panel is laid on the display 201 to operate buttons arranged in the operation screen. The image scanner 21 is capable of reading a color document. The printer 22 is provided with a paper discharge unit 22A that can sort sheets of printed paper for discharge. The printer 22 prints, through the electrophotographic method, a black and white image or a color image on a single side or double sides of a sheet of paper fed from the multi-deck paper deck 23. The power circuit 24 supplies power to various power requiring portions of the multifunction device 2. The control circuit 25 includes a Read-Only Memory (ROM) 251 storing therein a control program, a Central Processing Unit (CPU) 252 executing the control program, and a Random Access Memory (RAM) 253 used as a work area when the program is executed. The image processing circuit 26 performs various processes including mapping data in a bitmap form for copying or printing. The facsimile communication modem 27 is used for fax communication through the public line. The external interface 28 is used for connecting to a LAN cable. The storage 29 in this example is a hard disk drive (HDD) having a large capacity of more than tens of gigabytes of a non-volatile storage area.

The storage 29 is provided with, in addition to a storage area for storing data for controlling the multifunction device 2, a box that is a storage area for storing various types of document data and images. The data stored in the storage area for performing control includes a user management table T1 and a document management table T2. These tables T1 and T2 are loaded in the RAM 252 as required. Referring to FIG. 2, a shared box 51 is illustrated to represent the boxes. The shared box 51 is shared by a plurality of users.

As illustrated in FIG. 3, the user management table T1 stores therein a user name and a password for user authentication in association with each other. When the multifunction device 2 suspends printing according to the instructions by a user, "print suspended document name" and "suspended box name" are associated with the user. For example, a file name of a print suspended document whose print has not been completed is recorded as the print suspended document name, and identification information of a box storing therein the print suspended document is recorded as the suspended box name.

As illustrated in FIG. 4, data stored in the document management table T2 includes print management information 70 and edit management information 75. The print management information 70 relates to the suspension of printing and includes data having items of "print suspended operator", "print suspended page", "total number of pages print flag", and "print suspended time". The print suspended operator indicates a user who performs operation for instructing suspension of print in the middle of printing. In the illustrated example, the print suspended operators are indicated in order of registration in the user management table T1. The print suspended page indicates a page number which was being printed when the printing was suspended and signifies which pages of the print suspended document are unprinted. The total number of page print flag indicates presence or absence of designation indicating whether the number of pages (number of total pages) is printed or not when print is performed. The print suspended time indicates a date and time at which the print is suspended. The edit management information 75 relates to editing of the document and includes items of "edit flag" and "printed and edited page". The edit flag indicates whether or not the document whose printing was suspended has been edited or not. The printed and edited page indicates a page, in the suspended print job, that had been printed before printing was suspended and that has been updated by editing thereafter.

Figure 5:
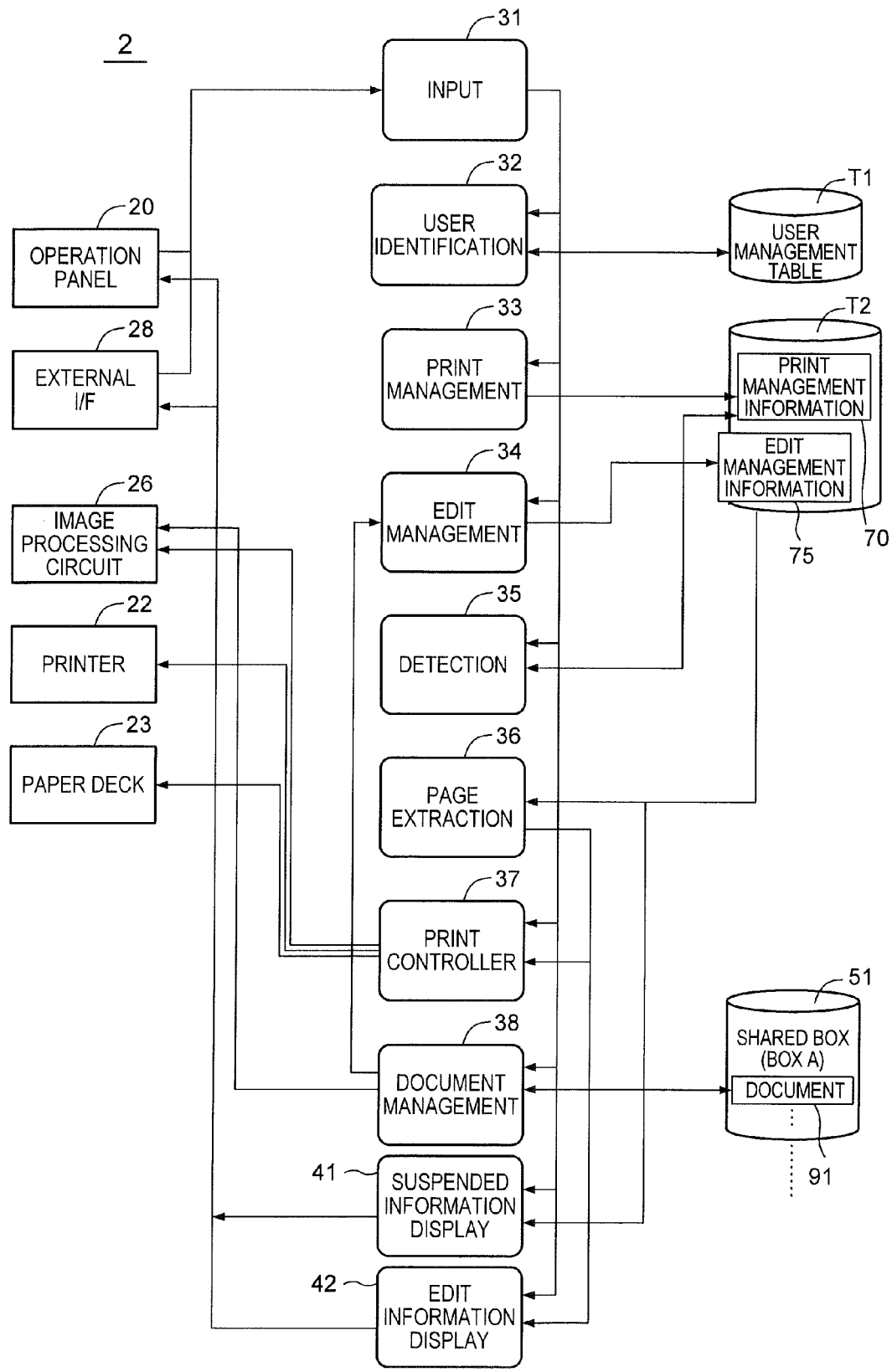
FIG. 5 is a diagram illustrating a functional configuration of the multifunction device.

FIG. 5 illustrates a functional configuration of a principal portion relating to the suspension of print in the multifunction device 2. As illustrated in FIG. 5, the multifunction device 2 is provided with an input portion 31, a user identification portion 32, a print management portion 33, an edit management portion 34, a determination portion 35, a page extraction portion 36, a print control portion 37, a document management portion 38, a suspension information display portion 41, and an edit information display portion 42. These functional elements (portions) are implemented by the control computer program and the CPU 252 that executes the program as a computer.

The input portion 31 receives different types of operation performed by a user. The input portion 31 transfers data indicated by the operation performed through the operation panel 20 to a predetermined functional element that performs a process according to the data. For example, when the user identification screen is operated and a password is entered, the input portion 31 transfers the entered password to the user identification portion 32. The input portion 31 also transfers, to a predetermined functional element that performs the process accordingly, data that is received through the external interface 28 and that represents the operation originated from the personal computer 3 or 4, or other external devices.

The user identification portion 32 identifies a user who performed some type of operation on the multifunction device 2. The identification thus performed in response to the operation through the operation panel 20 is based on user information that is entered through user log-in operation performed by the user when he or she uses the multifunction device 2. In the process of user identification in response to the log-in operation by the user, the user management table T1 is referred to. Any operation performed through the operation panel 20 once a user is successfully authenticated as a log-in user is considered as operation performed by the log-in user. In other words, the user identification portion 32 considers the current log-in user as a user who performs the operation. Also, the identification made in response to the operation through an external device including the personal computers 3 and 4 is based on the user information entered in the process of user identification. This means that any operation through the external device which is in a log-in state and allowed for access is considered as the operation performed by the user who has been authenticated in the log-in process.

The print management portion 33 updates the print management information 70 in the document management table T2. When suspension operation is performed to halt printing during the printing process of a document, the print management information 70 about the document is recorded. The print management information 70 signifies unprinted pages and indicates a user who performs suspension operation as described above.

The edit management portion 34 updates the edit management information 75 in the document management table T2. When editing operation is performed to update data of a certain page of a document, the edit management information 75 about this document is recorded. The edit management information 75 indicates the presence or absence of editing and a page that was printed before the suspension of the printing and edited thereafter as described above.

The determination portion 35 determines whether or not the user identified by the user identification portion 32 is a user who suspended the printing. Specifically, the determination portion 35 determines whether such a user is recorded as "print suspended operator" in the print management information 70. Here, the "print suspended operator" is a user who has performed operation to suspend printing of a document midway through printing but has not performed reprinting operation thereafter for the same document. The record in the print management information 70 indicating the print suspended operator is deleted when printing in response to the reprinting operation is completed. Consequently, it is possible to find out whether a log-in user at a given time corresponds to the print suspended operator or not if the print management information 70 is referred to.

The page extraction portion 36 extracts pages required to be reprinted from a document to be printed in the printing process in response to the reprinting operation. The pages required to be reprinted are those pages that have been updated after printing and therefore may include information that has not been printed. When a log-in user who is determined to be a print suspended operator by the page determination portion 35 performs reprinting operation to instruct printing of a document whose printing was once suspended and whose data has bee updated thereafter, the page extraction portion 36 refers to the print management information 70 and the edit management information 75, and extracts those pages that were actually printed when the printing was suspended and have been updated thereafter.

The print control portion 37 controls operation of the printer 22 and the paper deck 23. The print control portion 37, in corporation with the document management portion 38, provides print data of a document to be printed to the printer 22 in a print job in which a document 91 in the shared box 51 or a document in another box is printed. In the printing in response to the reprinting operation, the print control portion 37 makes the printer 22 print at least unprinted pages and the pages extracted by the page extraction portion 36 of the document to be processed.

The document management portion 38 manages documents in the shared box 51 or another box. When the multifunction device 2 is provided with an edit job or a delete job targeting a document in the shared box 51 or another box, the document management portion 38 edits or deletes the document to be targeted according to the instructions by a user.

The suspension information display portion 41 informs a user that there exists a print suspended document that is a candidate for reprinting. To be more specific, if a log-in user is the print suspended operator, the suspension information display portion 41 displays information indicating the existence of a print suspended document whose printing was once suspended by the log-in user. The displayed information is, for example, a file name of the document and information that the printing of the document was suspended. When operation is performed through the operation panel 20, then the display 201 of the operation panel 20 displays the information. When the operation is performed through the network, then the information is displayed on a display of an external device which accesses the multifunction device 2.

The edit information display portion 42 informs that a document whose printing was suspended has been updated thereafter. If a log-in user is the print suspended operator, and, at the same time, if the print suspended document specified as a document to be reprinted has been updated after the suspension of the printing, the edit information display portion 42 displays information indicating the pages extracted by the page extraction portion 36. Such a display of the information is performed on the display 201 of the operation panel 20 or on a display of an external device according to how the operation is performed.

Figure 6A:
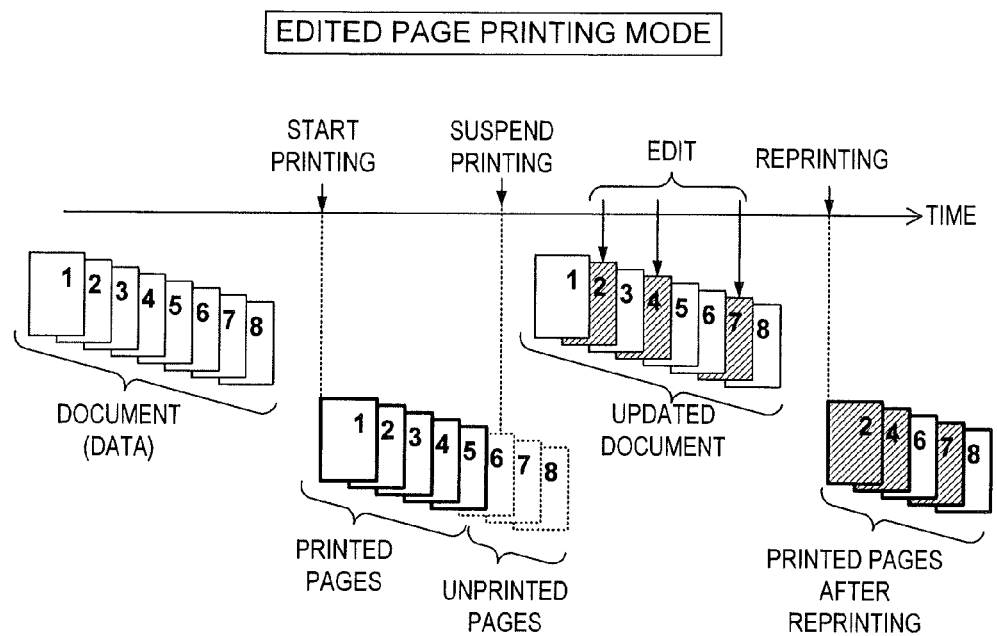
FIGS. 6A-6C are diagrams illustrating printing pages in each of a plurality of printing modes.
Figure 6B:
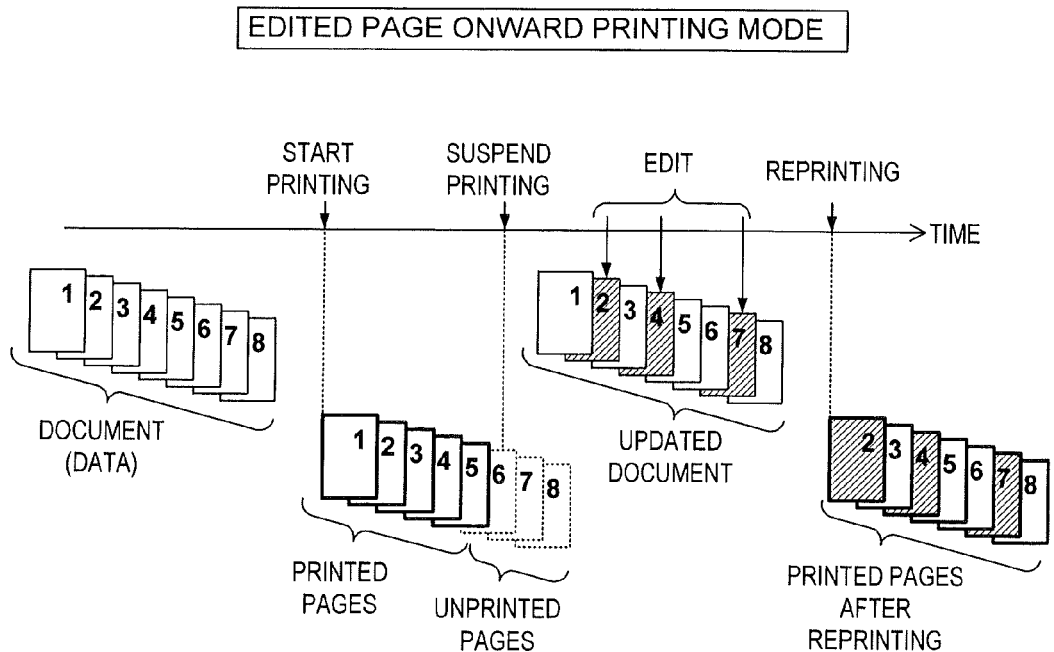
Figure 6C:
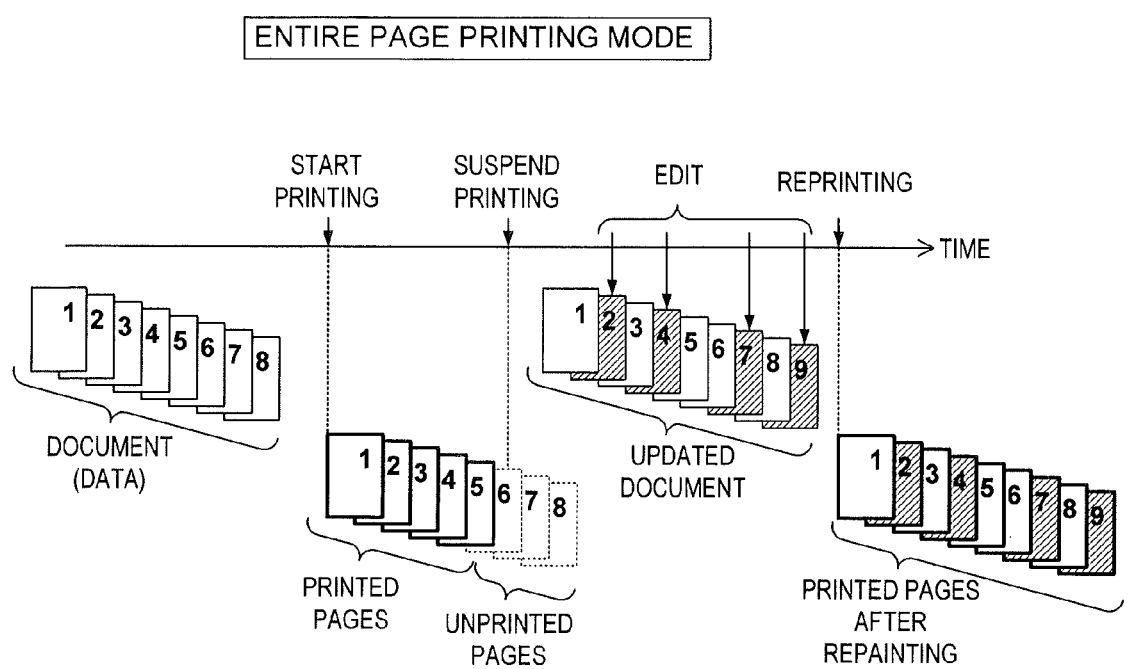

The multifunction device 2 configured as described above is provided with three printing modes for reprinting as illustrated in FIGS. 6A-6C. FIGS. 6A-6C illustrate examples in which printing of a document consisting of eight pages was suspended when the sixth page was being printed, and reprinting is performed thereafter. In actual cases, it is unlikely to suspend the printing if a document consists of a smaller number of pages, and many of the cases where the printing is suspended involve the number of pages more than 10. However, this is not limited in the multifunction device 2, and the number of pages is arbitrarily decided.

In "edited page printing mode" illustrated in FIG. 6A, unprinted pages each of which was not successfully printed and pages that have been updated by editing performed after the print suspension will be printed in response to reprinting operation performed to instruct the resumption of the printing. In the example, the unprinted pages are the sixth, seventh, and eighth pages, and the pages updated after the print suspension are the second, fourth, and seventh pages with hatching in the illustrations. Pages that will be reprinted are the second, fourth, sixth pages, and onward. The edited page printing mode is for printing only those pages that have not been printed from the updated document, and is a mode that does not produce unedited duplicated pages between the printing before and after the suspension.

In "edited page onward printing mode" illustrated in FIG. 6B, a response to the reprinting operation performed to instruct resuming of the printing entails printing of a page having the smallest page number and pages onward therefrom among unprinted pages when printing was suspended and those pages printed before the printing was suspended but updated thereafter. In the example, the page having the smallest page number among those pages printed before the printing was suspended and updated thereafter is the second page. Therefore, the second page and onward therefrom, i.e., the second to eighth pages, will be printed. In this example, the second to eighth pages that will be printed include the unprinted pages, i.e., the sixth to eighth pages. The edited page onward printing mode provides advantages in which a sorting work is made easier than that in the edited page printing mode described above. In this case, the sorting work involves arranging sheets of paper printed before and after the suspension of the printing in order of page numbers.

In "entire page printing mode" illustrated in FIG. 6C, all pages of the document will be printed in response to reprinting operation performed to instruct reprinting. Accordingly, a user who coincides with the print suspended operator can obtain the printed matter including entire pages of the up-to-date document without sorting the pages printed before and after the suspension. The entire page printing mode is useful particularly when such a document whose total number of pages changes between before and after the suspension and, for example, when a symbol representing a total number of pages is printed together with the page number. Because, otherwise, it is necessary to print the pages that were printed before the suspension again in such a way that these pages also carry the symbol indicating the latest total number of pages. In the illustrated example, the total number of pages has been increased from 8 to 9 after the suspension. The total number of pages increases or decreases by insertion or deletion of text, images, and charts, or by insertion or deletion of a form feed command.

In this embodiment, a user specifies one of the three printing modes. However, this may be selected automatically. In implementing the automatic selection of the modes, for example, as a basic way, the edited page printing mode or the edited page onward printing mode is selected first, and then the entire page printing mode is selected only when the total number of pages has changed and at the same time the total number of pages needs to be printed.

Hereinafter, a description will be given of the operation of the multifunction device 2 in detail with reference to the flowcharts.

FIRST OPERATION EXAMPLE

Figure 7:
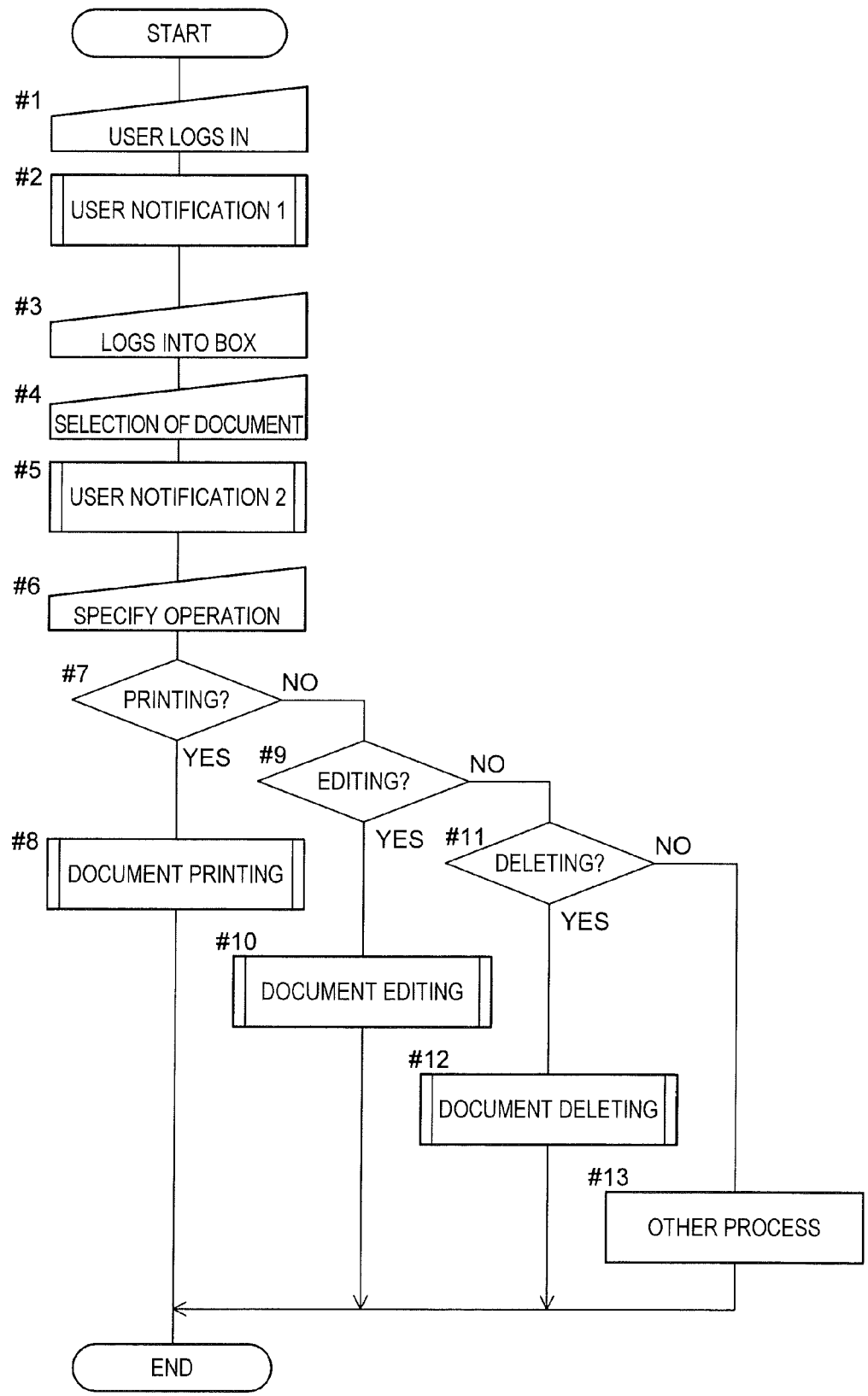
FIG. 7 is a flowchart outlining a first operation example of the multifunction device.

FIG. 7 depicts outlines of a first operation example of the multifunction device 2. The multifunction device 2 executes, in accordance with the operation performed by a user, printing, editing, deletion, or other operation. The user who wishes to use the multifunction device 2 should be subjected to a user authentication by performing user log-in operation. The authenticated log-in user further performs predetermined box log-in operation to be thereby allowed to access documents stored in the shared box 51 or other boxes.

Figure 8:
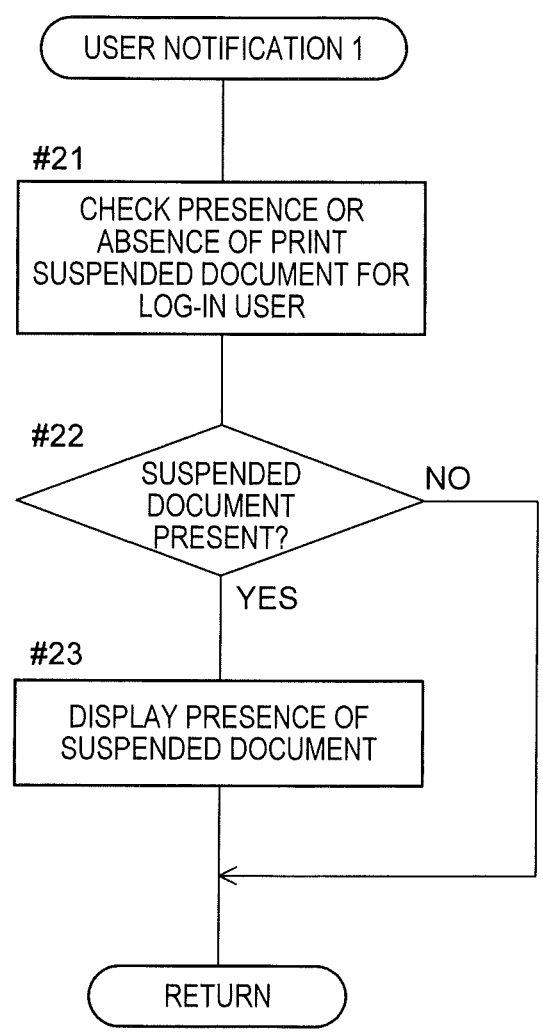
FIG. 8 is a flowchart depicting a user notification 1 routine depicted in FIG. 7.

The multifunction device 2 thus authenticated the user executes a user notification 1 process (#1, #2). The details of the user notification 1 process are depicted in FIG. 8. First, the user identification portion 32 refers to the user management table T1 and checks for the presence or absence of a print suspended document corresponding to the log-in user (#21). This checking corresponds to checking whether the log-in user is the print suspended operator or not. If the print suspended document corresponding to the log-in user is present, the suspension information display portion 41 shows a display to notify the log-in user of the presence of the print suspended document as described before (#22, #23). If the print suspended document corresponding to the log-in user is not found, i.e., the log-in user is not the print suspended operator, then such a display is not shown.

When the log-in user is the print suspended operator and does not remember the presence of the print suspended document, the user notification 1 process reminds such a user of the print suspended document. The log-in user who has recalled the print suspended document corresponding to the user determines whether reprinting is necessary or not, and performs operation for reprinting if it is necessary. On the other hand, if the user has performed the log-in operation for the purpose of reprinting, the log-in user can confirm the existence of the print suspended document through the display performed in the user notification 1 process.

Figure 9:
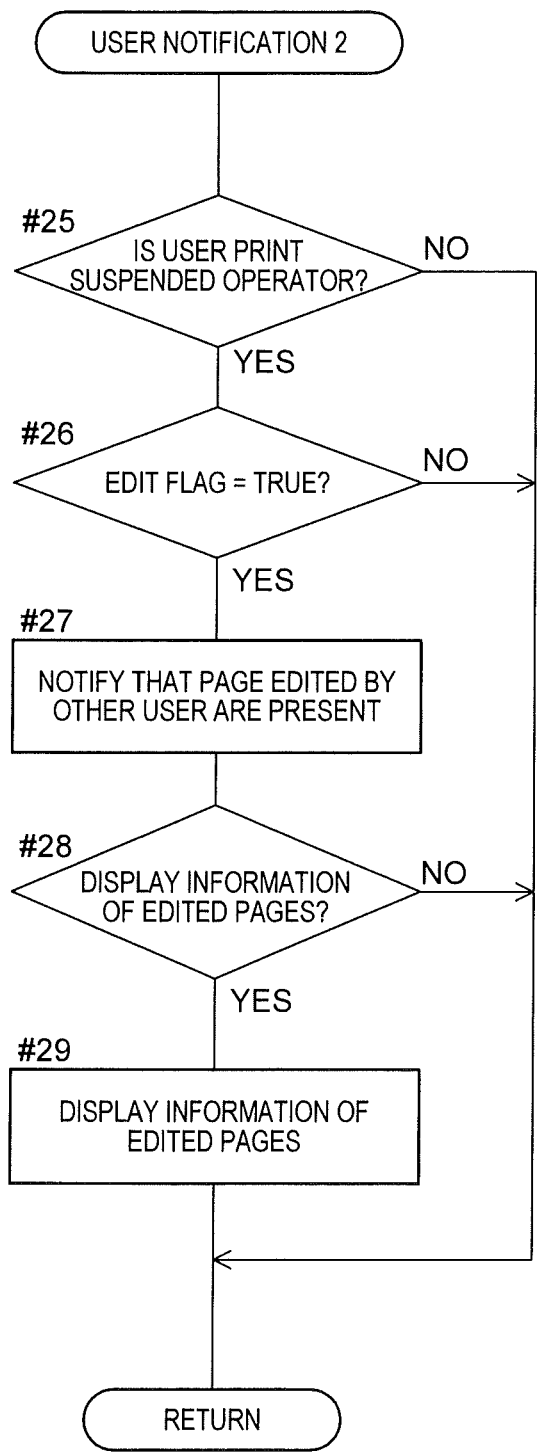
FIG. 9 is a flowchart depicting a user notification 2 routine depicted in FIG. 7.

Referring back to FIG. 7, when the log-in user performs box log-in operation (#3) and further selects a document to be processed from among the documents in a list display format (#4), the multifunction device 2 performs the user notification 2 process (#5). The details of the user notification 2 process are depicted in FIG. 9. If the log-in user is not the print suspended operator, the user notification 2 process is substantially bypassed (#25). If the log-in user is the print suspended operator, then the edit information display portion 42 searches through the edit management information 75 in the document management table T2 and checks the state of the edit flag for the document to be processed that is selected by the log-in user. If the edit flag indicates "TRUE" (#26), the document to be processed is a print suspended document and has been updated after printing was suspended. In this case the edit information display portion 42 displays a message notifying that there is a page that was edited by another user (#27). Additionally, with instructions provided by the log-in user, the edit information display portion 42 displays information useful for determining a printing mode for reprinting, such as which page has been edited (#28, #29).

Referring back to FIG. 7 again, if the operation specified by the log-in user is printing, the multifunction device 2 performs a document printing routine. If editing is specified, a document editing routine is performed (#6-#10). If deletion is specified, a document deletion routine is performed, if another operation is specified, another process routine is performed (#11-#13).

Figure 10:
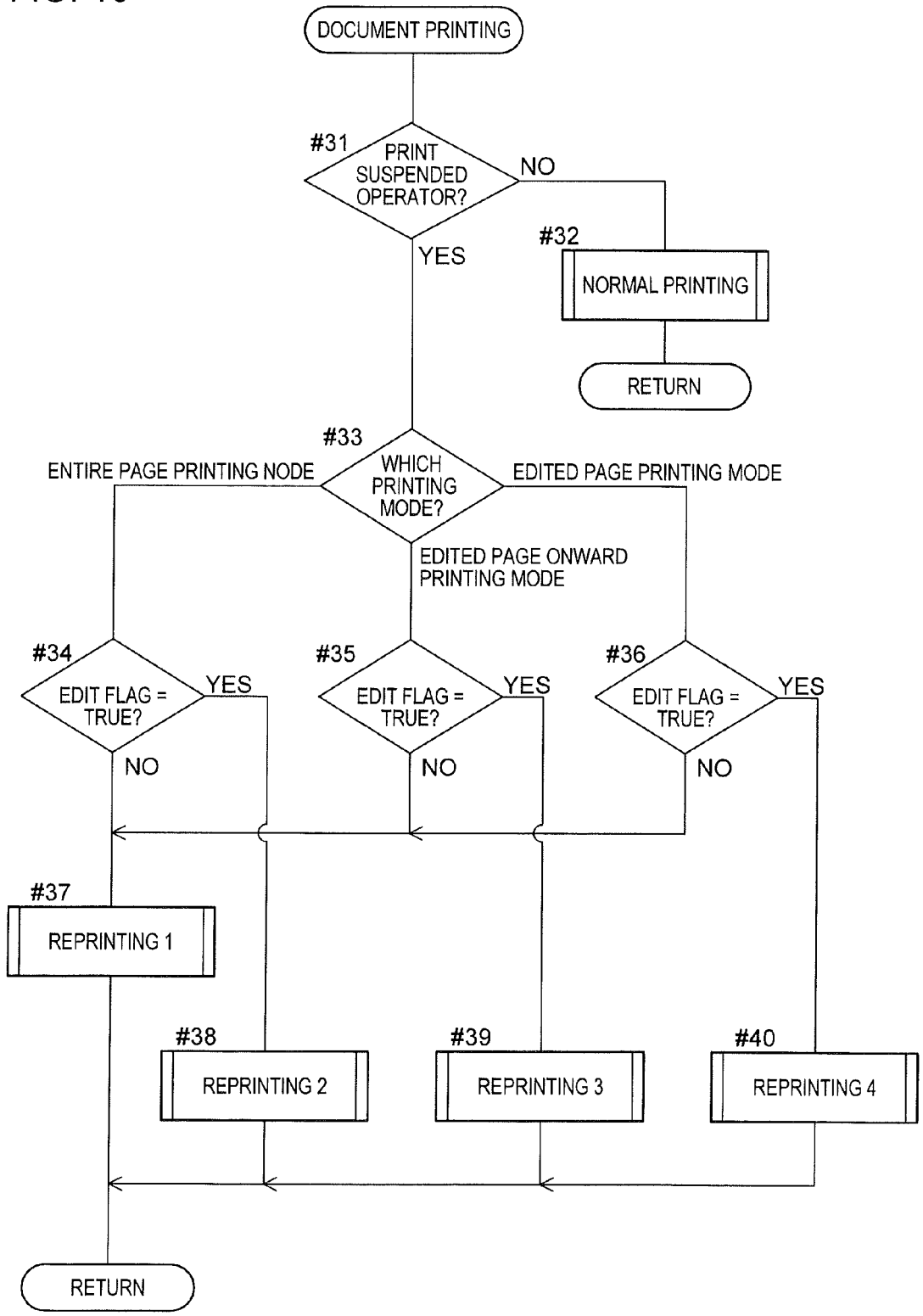
FIG. 10 is a flowchart depicting a document printing routine depicted in FIG. 7.

FIG. 10 illustrates details of the document printing routine in step #8 in FIG. 7. In this routine, the multifunction device 2 performs an ordinary printing subroutine if the log-in user is not the print suspended operator (#31, #32). If the log-in user is the print suspended operator, then the multifunction device 2 performs any one of reprinting 1-reprinting 4 subroutines according to the selected printing mode and the state of the edit flag (#33-#40). To be specific, regardless of the printing mode, i.e., any one of the entire page printing mode, the edited page onward printing mode, and the edited page printing mode, if the edit flag indicates "FALSE" which is a reset state, the reprinting 1 subroutine (#37) is performed. If the edit flag indicates "TRUE" which is a set state, the reprinting 2 subroutine (#38), the reprinting 3 subroutine (#39), and the reprinting 4 subroutine (#40) are performed in the entire page printing mode, the edited page onward printing mode, and the edited page printing mode, respectively.

Figure 11:
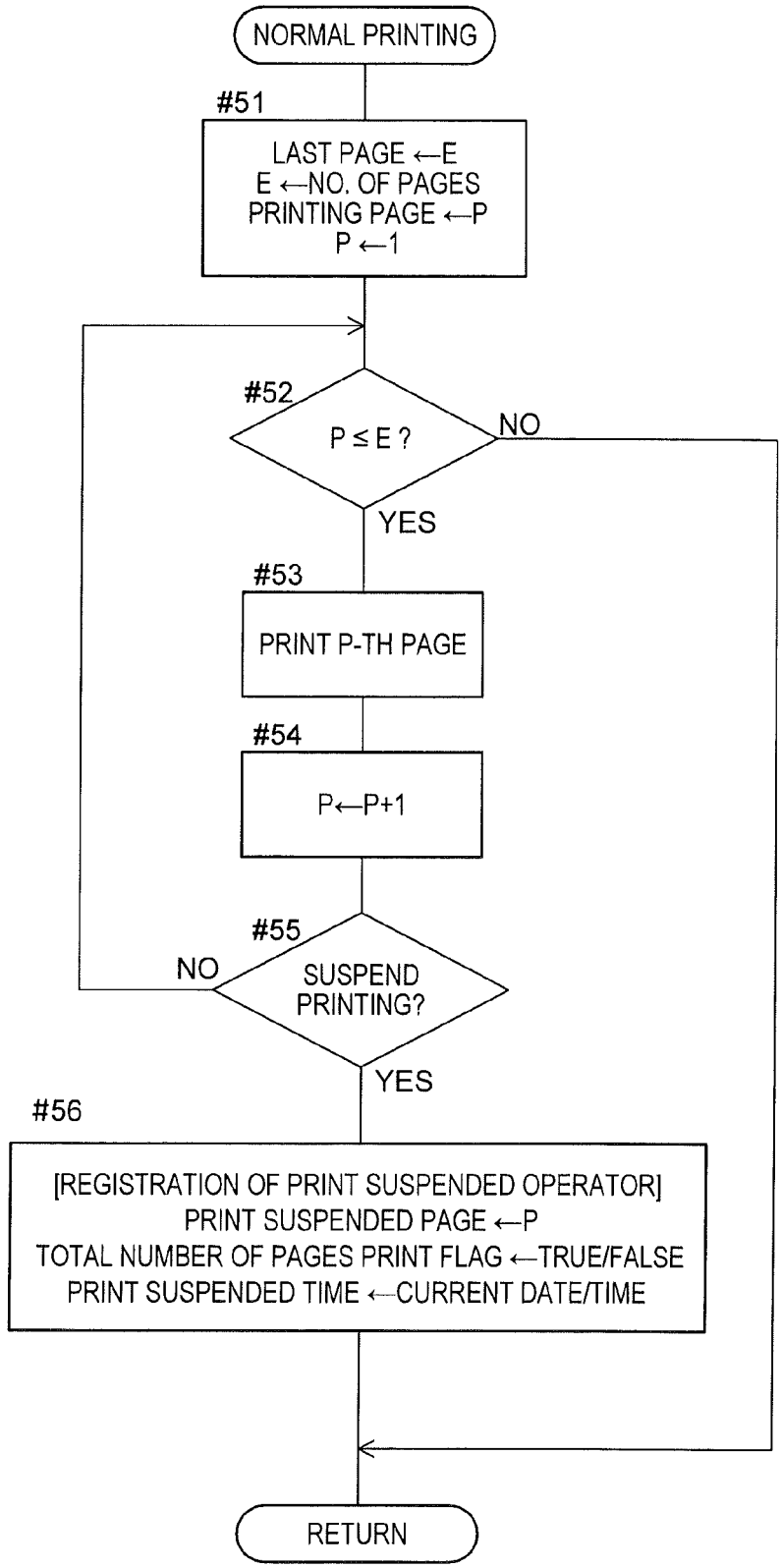
FIG. 11 is a flowchart depicting an ordinary printing subroutine depicted in FIG. 10.

FIG. 11 illustrates details of the ordinary printing subroutine in step #32 in FIG. 10. As illustrated in FIG. 11, in the ordinary printing subroutine, the print control portion 37 sets, at the outset of the routine, values for "last page E" and "print page P" which are control parameters (#51). The value of the last page E is made equal to the total number of pages of the document to be processed stored in the document management table T2. A value "1", a default value, is set to the print page P. Then, the page having a page number indicated by the print page P is printed, and the value of the print page P is incremented by "1". Basically, this process is repeated until the value of the print page P reaches the value of the last page E (#52-#55). In this way, the entire pages of the document to be processed are printed.

If operation to suspend printing is performed during printing, i.e., when the value of the print page P is equal to or less than the value of the last page E, the print control portion 37 suspends the printing. Then, the print management portion 33 registers the log-in user in the print management information 70 of the document management table T2 as a print suspended operator (#56). At the same time, the print management information 70 records therein the value of the print page P as a print suspended page, necessity (TRUE or FALSE) to print the total number of pages indicated by metadata of the document to be processed as a total number of pages print flag, and the current date and time indicated by the system clock as print suspended time.

Figure 12:
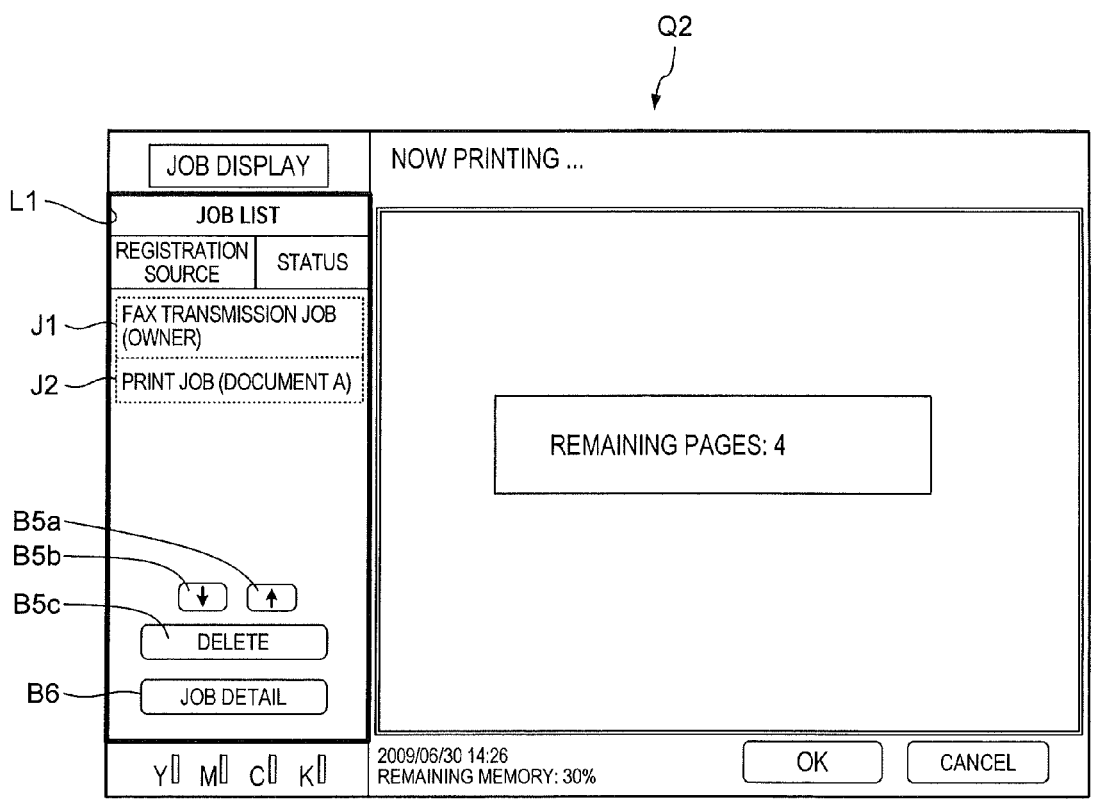
FIG. 12 is a diagram illustrating one example of an operation screen through which a print suspension operation can be performed.

The print suspending operation is the operation to cancel a print job. For example, the print suspending operation performed through the operation panel 20 is exemplified by pressing a cancel key B5c in a job list L1 on an operation screen Q2 illustrated in FIG. 12. The job list L1 indicates active jobs J1 and J2 which are jobs in execution or in queue. A user can select a job by pressing an arrow key B5a or B5b arranged in a bottom portion of the job list L1. It is also possible to display detail information such as the number of sets to print and settings for sorting in the print job by operating a job detail key B6.

When the user presses the cancel key B5c, the execution of a job selected in the job list L1 is canceled, and this job is deleted from the job list L1. Particularly, if the job is a print job, data for printing in a form of bitmapped data obtained by analyzing document data will be deleted. If the user canceled a print job of a document in queue and wishes to print the document by the multifunction device 2, the user is required to provide a print job anew. However, if the user canceled a print job in execution, i.e., the print job is suspended, the print management information 70 for reprinting is recorded as described previously. Accordingly, the user can print unprinted pages without specifying any specific pages.

Figure 13:
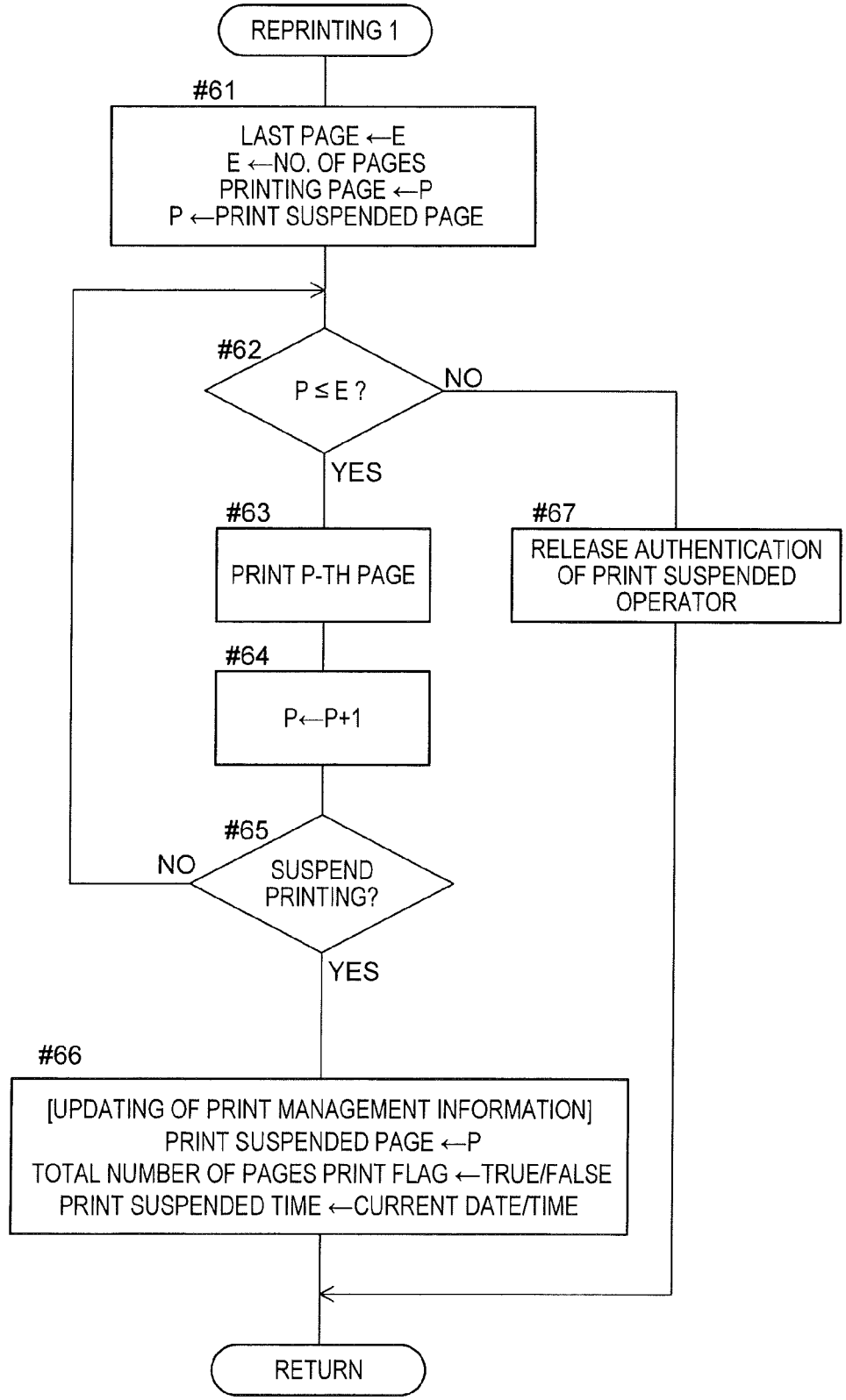
FIG. 13 is a flowchart depicting a reprinting 1 subroutine depicted in FIG. 10.

FIG. 13 depicts the details of the reprinting 1 subroutine in step #37 depicted in FIG. 10. This subroutine is almost the same as the ordinary printing subroutine. Control parameters are set (#61), and processes for printing a page indicated by the print page P and incrementing the print page P are repeated until the value of the print page P reaches the value of the last page E (#62-#65). Through these processes, entire pages of the document to be processed are printed. What is different from the ordinary printing subroutine is that, when the printing is completed, the verification that the log-in user is the print suspended operator is released (#67). In this reprinting 1 subroutine, when operation to suspend printing is performed during printing, the data such as the print suspended page, the total number of pages print flag, and the print suspended time which have been recorded and kept in the print management information 70 since the printing was suspended the last time is updated by the data corresponding to the print suspension this time (66).

Figure 14:
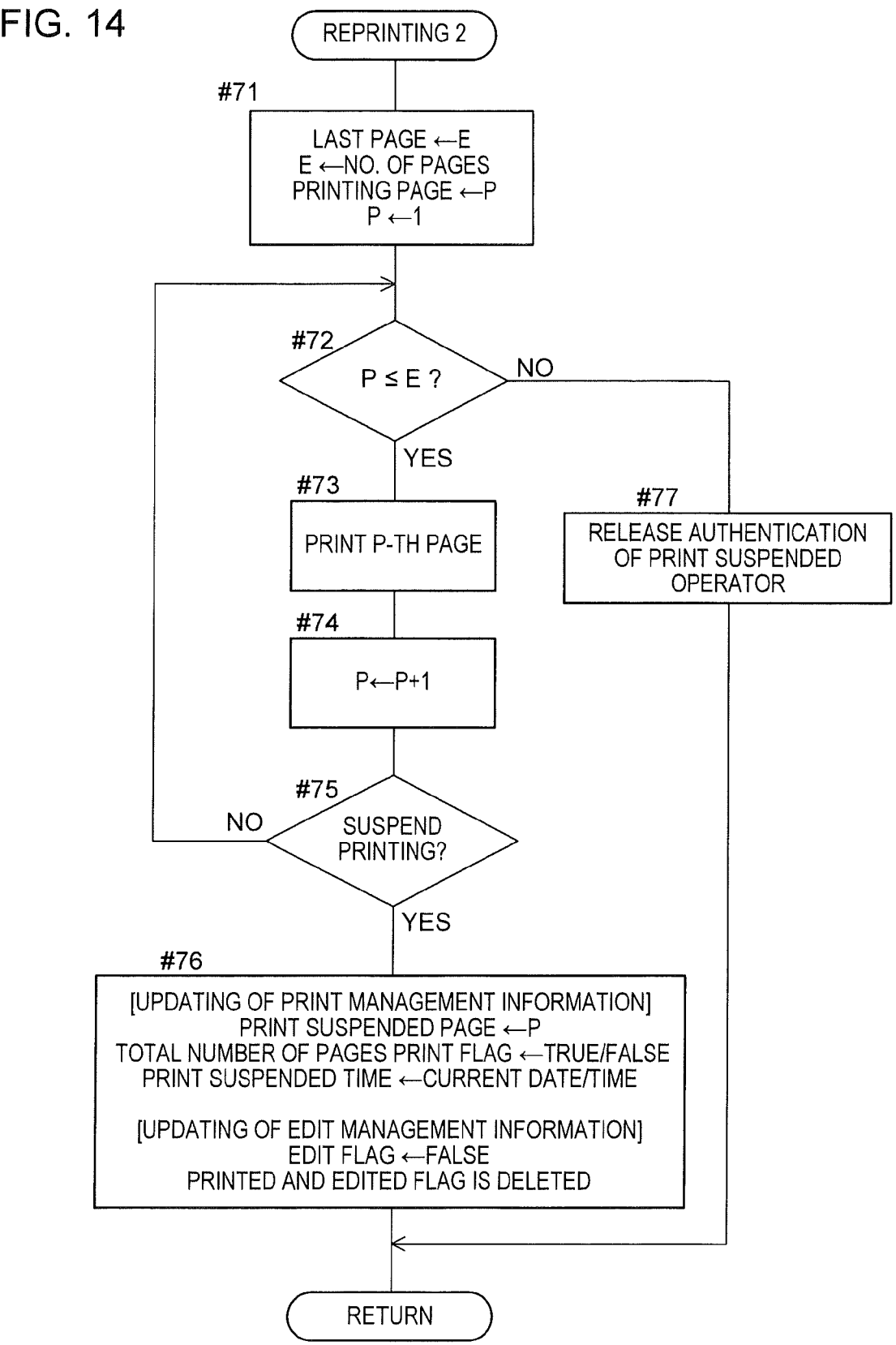
FIG. 14 is a flowchart depicting a reprinting 2 subroutine depicted in FIG. 10.

FIG. 14 depicts the details of the reprinting 2 subroutine in step #38 depicted in FIG. 10. In this subroutine, the processes (#71-#75, #77) performed when the printing is not suspended are identical with the processes (#61-#65, #67) of the reprinting 1 subroutine. If operation to suspend printing is performed during printing, the print management information 70 is updated, and the edit management information 75 is updated (#76) as in the case of the reprinting 1 subroutine. To be more specific, the edit flag indicating that editing has been performed after the print suspension is reset to "FALSE", and the data of the printed and edited page is deleted.

Figure 15:
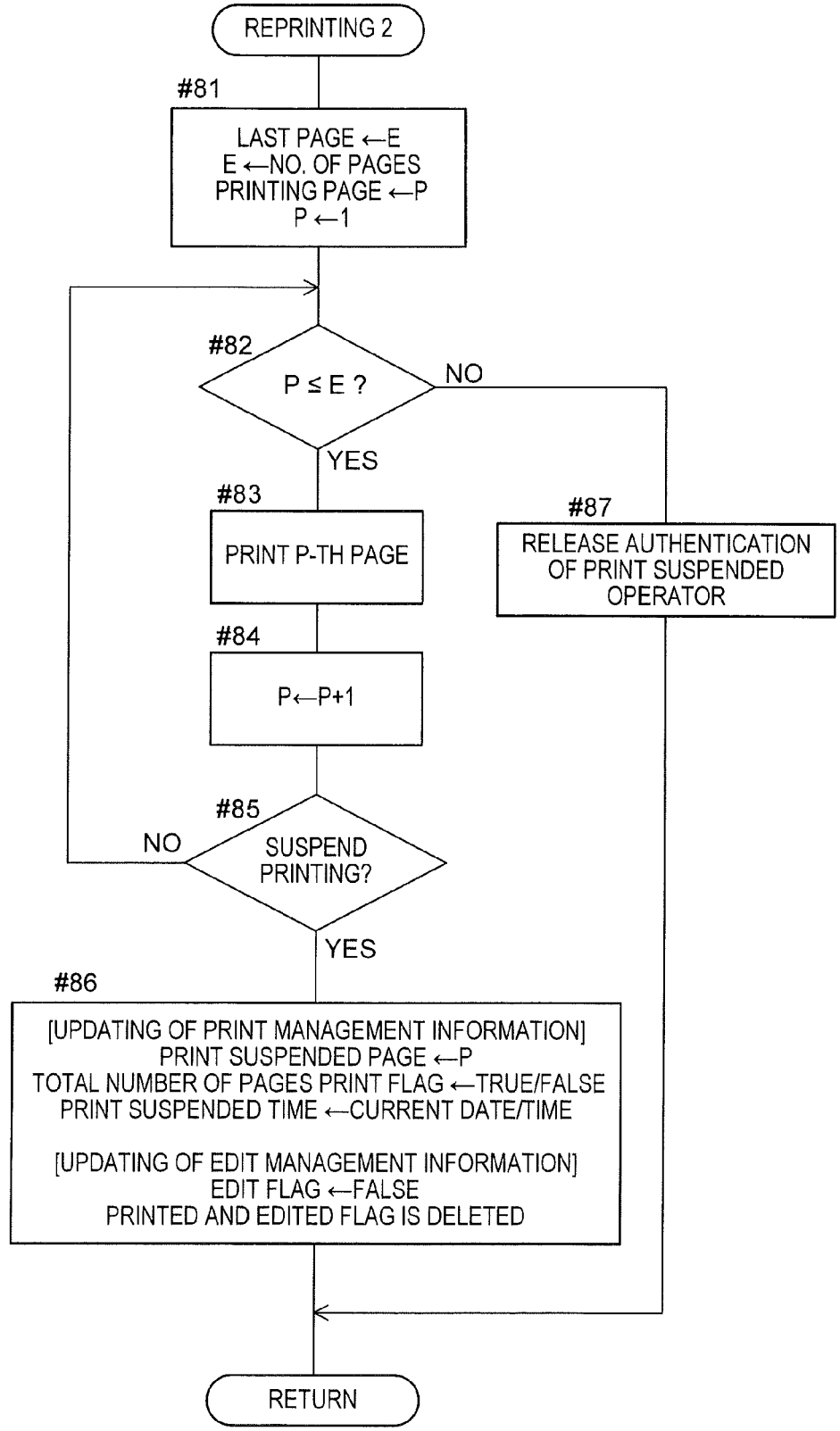
FIG. 15 is a flowchart depicting a reprinting 3 subroutine depicted in FIG. 10.

FIG. 15 depicts the details of the reprinting 3 subroutine in step #39 depicted in FIG. 10. In this subroutine, the processes (#82-#87) excluding the process for setting the initial control parameters are identical with the processes (#72-#77) of the reprinting 2 subroutine. When the initial control parameters are set, the value of the print page P is not set to "1" but set to a page number of a page having the smallest page number (hereinafter, referred to as "printed and edited top page") among the printed and edited pages recorded in the edit management information 75 (#81). With this arrangement, pages of the document to be processed consisting of the printed and edited top page and onward will be printed. For example, as exemplified in FIG. 6A, when the printed and edited pages are the 2nd, 4th, and 7th pages, the printed and edited top page is the 2nd page. If the total number of pages is eight, the printed and edited page and onward includes the 2nd to 8th pages. Here, there may be a case in which only a part of pages to be printed is subjected to editing and updated after suspension of printing. Also, there may be a case in which pages consisting of the printed and edited top page and onward include all pages that were not printed when printing was suspended.

Figure 16:
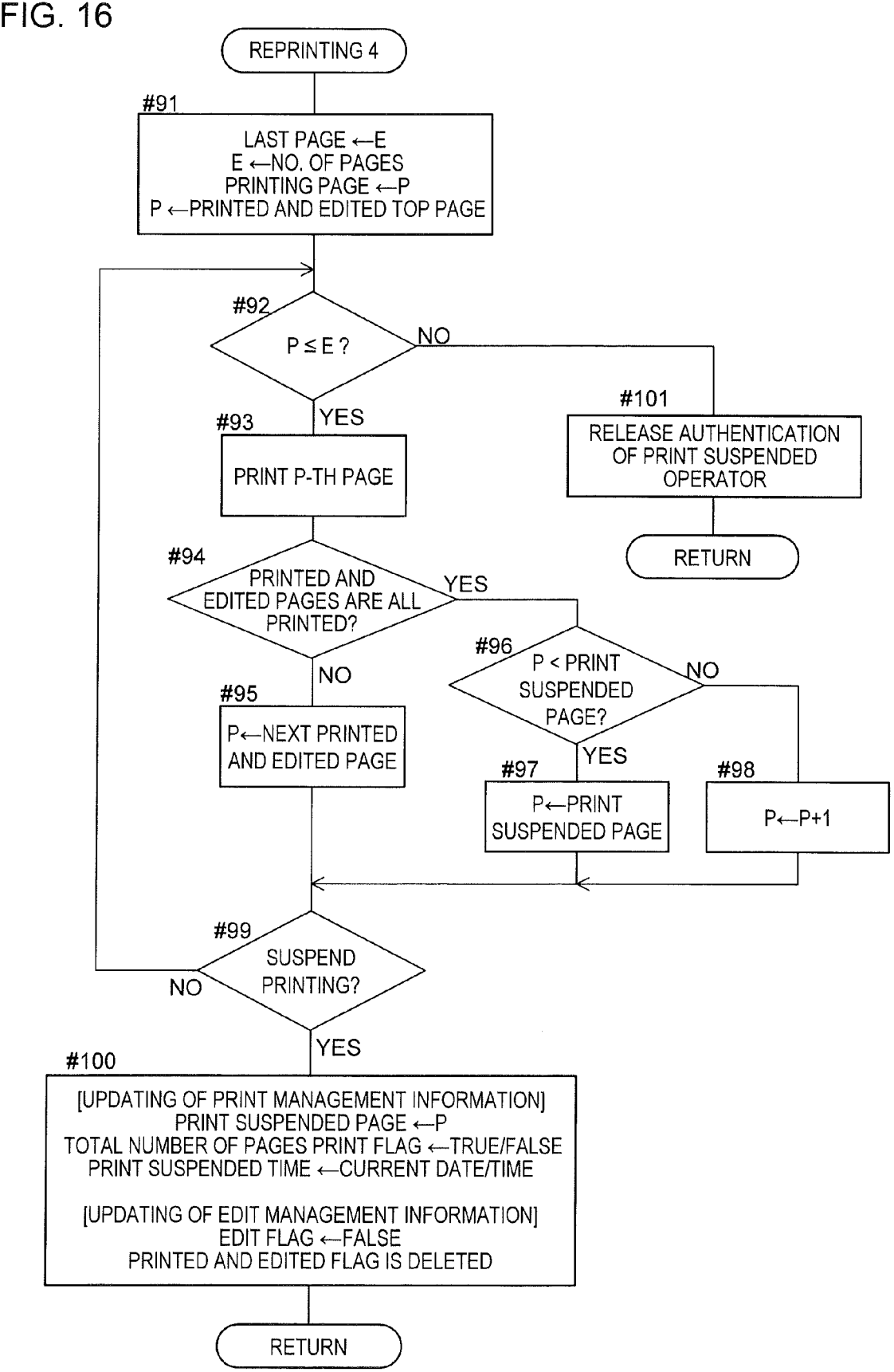
FIG. 16 is a flowchart depicting a reprinting 4 subroutine depicted in FIG. 10.

FIG. 16 depicts the details of the reprinting 4 subroutine in step #40 depicted in FIG. 10. In this subroutine, in the beginning, the control parameters are set (#91) in a similar manner as in the reprinting 3 subroutine. Thereafter, every time a page indicated by the print page P is printed, the print control portion 37 checks whether or not all the printed and edited pages are printed, and then the printed and edited page are printed sequentially (#92-#95, #99). When all of the printed and edited pages are printed (#94), the value of the printed page P is set to a page number of the print suspended page (#96, #97), a page having a page number indicated by the print page P is printed, and the print page P is incremented by "1" (#93, #99, #92-#94, #96). These processes will be repeated to thereby print unprinted pages of the document to be processed.

When the printed and edited pages and the unprinted pages are printed, the verification that the log-in user is the print suspended operator is released (#101) as in the cases of the reprinting 1-3 subroutines. If operation to suspend printing is performed during printing, the print management information 70 and the edit management information 75 are updated (#100) as in the cases of the reprinting 2-3 subroutines.

Figure 17:
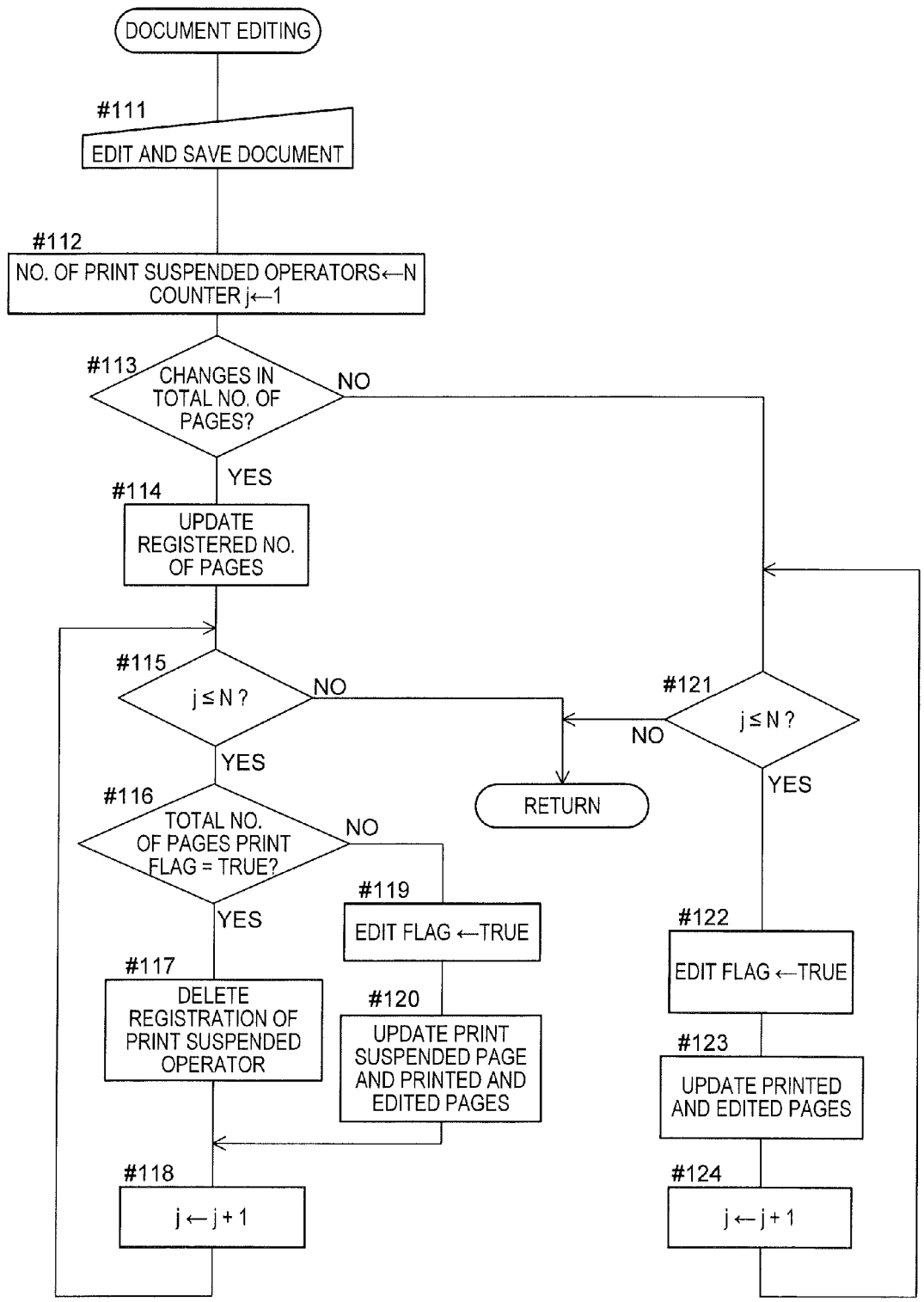
FIG. 17 is a flowchart depicting a document editing routine depicted in FIG. 7.

FIG. 17 depicts the details of the document editing routine in step #10 depicted in FIG. 7. When the log-in user edited a document to be processed and gives instructions for saving the document (#111), the document management portion 38 finds out the number of print suspended operators N related to the document to be processed and sets a value of a counter j that counts up the number of print suspended operators to a default value of "1" (#112). Subsequently, the document management portion 38 finds out whether the total number of pages of the document to be processed has increased or decreased as a result of editing (#113).

If there is an increase or decrease in the total number of pages, the document management portion 38 updates the number of pages registered in the document management table T2 (#114), and checks the total number of pages print flag in the print management information 70.

If the total number of pages print flag is in a set state, the document management portion 38 deletes N number of print suspended operators registered in the print management information 70 one by one (#115-#118). The following is the reason why the registration of the print suspended operators is deleted. In printing a document whose total number of pages is specified to be printed together, it is a common practice to print again the pages that have been printed before the print suspension. This means that it is not necessary to determine whether the document to be processed has been once suspended or not in printing.

If the total number of pages print flag is not in the set state, the edit management portion 34, upon receiving a notification from the document management portion 38, sets the edit flag to "TRUE" (#119). The edit management portion 34 also updates the information about the print suspended page included in the print management information 70. This updating of the information becomes necessary as the total number of pages changes and is performed by the edit management portion 34 along with the updating of information about the printed and edited page included in the edit management information (#120).

On the other hand, if there is no increase or decrease in the total number of pages, then the registration of the print suspended operators is not deleted, and the edit flag is set and the printed and edited page is updated for each of the N number of print suspended operators sequentially.

Figure 18:
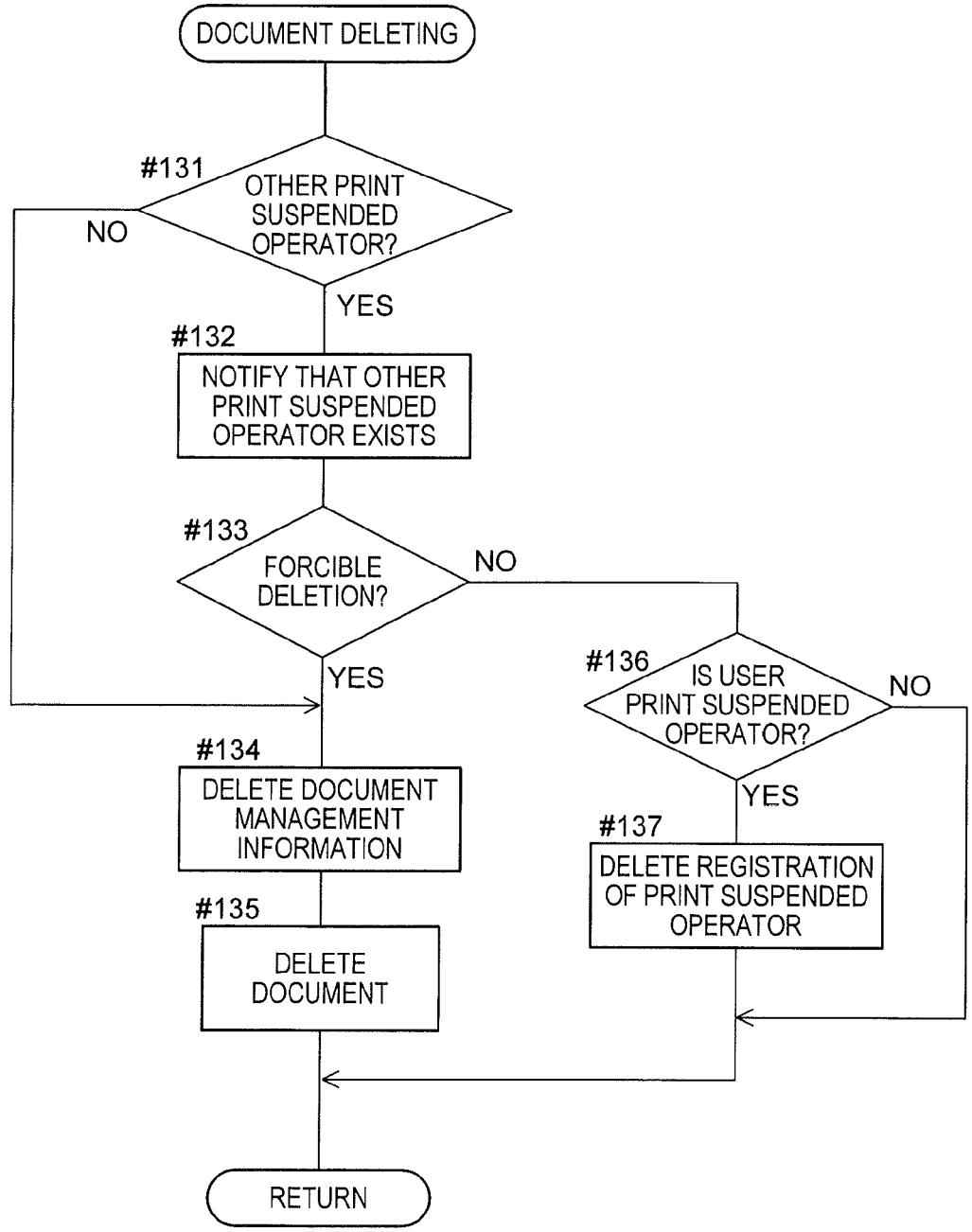
FIG. 18 is a flowchart depicting a document deletion routine depicted in FIG. 7.

FIG. 18 depicts the details of the document deletion routine in step #12 depicted in FIG. 7. The multifunction device 2, by referring to the print management information 70, checks whether or not any print suspended operator who does not correspond to the log-in user is recorded for a document selected by the log-in user (#131). If there is any of such a print suspended operator, the multifunction device 2 displays indicating this (#132). If the log-in user performs operation to allow deletion of the document despite the fact that there is such a print suspended operator who is not the log-in user, or if there is no print suspended operator who is not the log-in user, then the multifunction device 2 deletes the management information of the document to be processed and the document itself in the box (#133-#135). On the other hand, if the log-in user does not perform operation to allow the deletion while the log-in user himself or herself is the print suspended operator, the registration of the print suspended operator corresponding to the log-in user is deleted (#136, #137). In this case, the deletion of the registration is deemed to cause no problem. Because, it can be assumed that it is hardly possible for the user who provided a job for deleting the print suspended document relating to himself or herself will provide instructions for reprinting the print suspended document.

Figure 19:
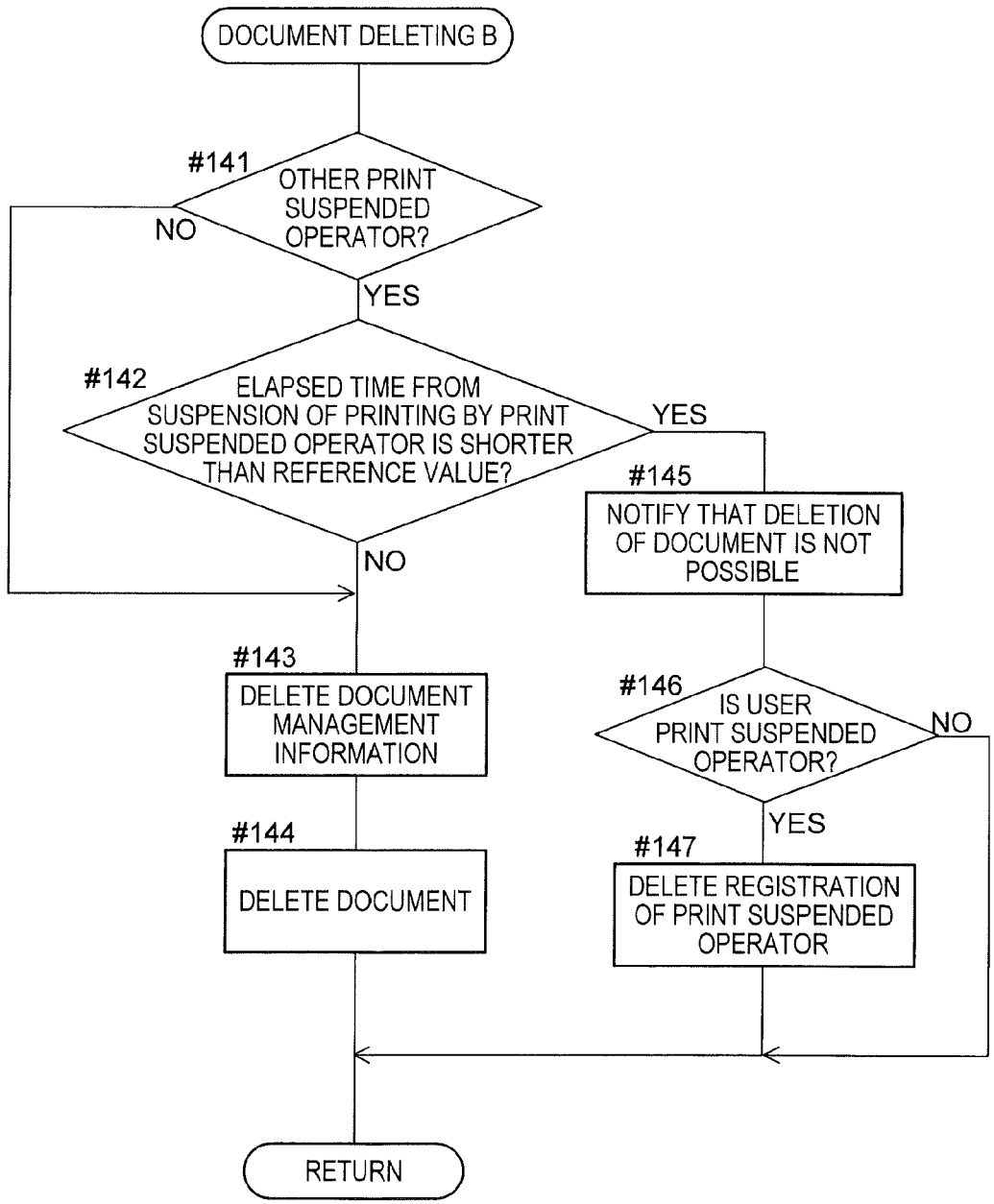
FIG. 19 is a flowchart depicting a first modified example of the document deletion routine depicted in FIG. 7.

FIG. 19 depicts a first modified example of the document deletion routine in step #12 depicted in FIG. 7. The multifunction device 2 checks whether or not any print suspended operator who is not a log-in user is recorded for a document selected by the log-in user (#141). If there is any of such a print suspended operator, the multifunction device 2 compares an elapsed time from the print suspended time corresponding to such a print suspended operator with a reference time. If the elapsed time is larger than the reference time, it is assumed that the print suspended operator has no intension to reprint the document. Accordingly, when the elapsed time is larger than the reference time and there is no print suspended operator who is not the log-in user, the multifunction device 2 deletes the management information of the document to be processed and the document itself in the box (#141-#144).

The reference time may be set to any desired length of time. For example, it is possible to use 24 hours or one week. It is also possible to set an identical reference time to all boxes or, alternatively, set different lengths of reference time to different boxes individually. The setting of the reference time is performed by an administrator on an operation screen used for maintenance.

When the elapsed time is shorter than the reference time, the period therebetween is a period in which deletion is prohibited. When the elapsed time is shorter than the reference time, the multifunction device 2 displays a message notifying the log-in user of the fact that the deletion is prohibited (#145). Then, if the log-in user is the print suspended operator, the registration of the print suspended operator corresponding to the log-in user is deleted (#146, #147).

Figure 20:
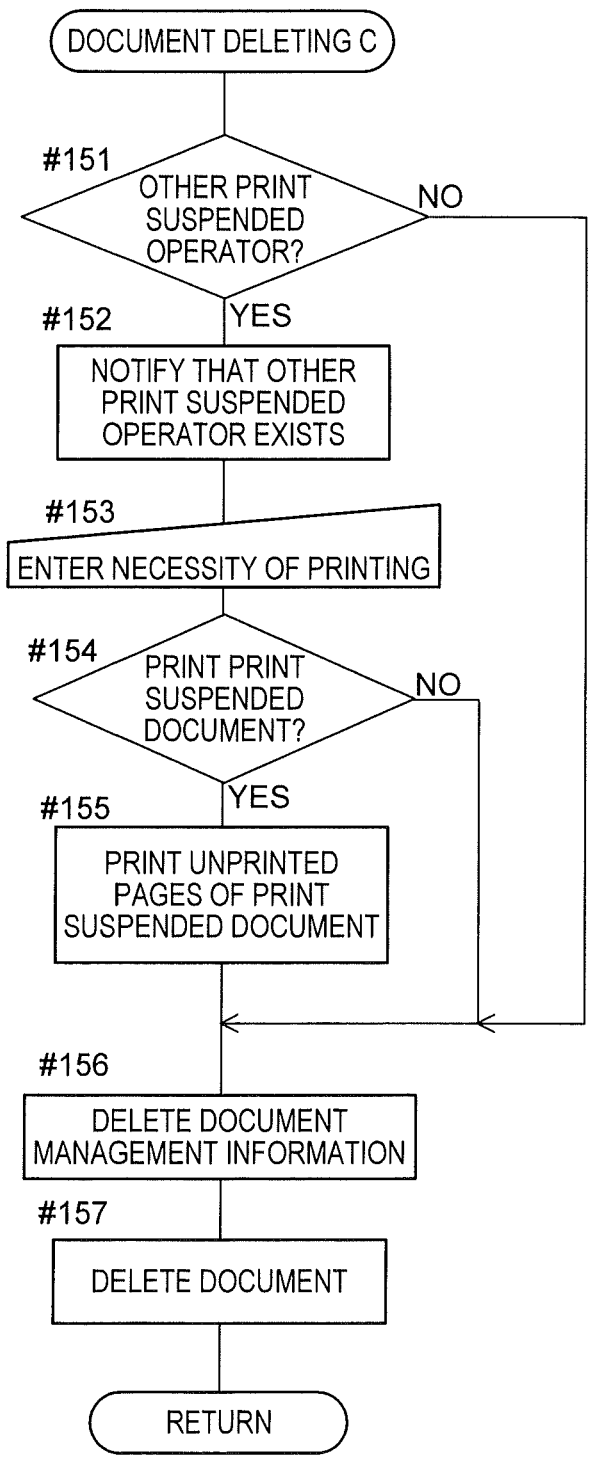
FIG. 20 is a flowchart depicting a second modified example of the document deletion routine depicted in FIG. 7.

FIG. 20 depicts a second modified example of the document deletion routine in step #12 depicted in FIG. 7. The multifunction device 2 checks whether or not any print suspended operator who does not correspond to the log-in user is recorded for a document to be processed selected by the log-in user (#151). If there is any of such a print suspended operator, the multifunction device 2 displays a message informing to that effect (#152). At the same time, the multifunction device 2 asks the log-in user for his or her intention about printing unprinted pages of the print suspended document related to other users. When the log-in user performs operation to allow printing (#153, #154), the multifunction device 2 prints unprinted pages if the document to be processed is a print suspended document (#155). Thereafter, the multifunction device 2 deletes the management information of the document to be processed and the document itself in the box (#156-#157).

Here, it is possible to avoid a situation where the printed paper is left in the paper discharge section of the multifunction device 2 unattended for a long period of time if it is arranged that the log-in user, who allowed the multifunction device 2 to print the unprinted pages, delivers the printed paper to a user who suspended printing of the document or makes contact with the user as quickly as possible.

SECOND OPERATION EXAMPLE

Figure 21:
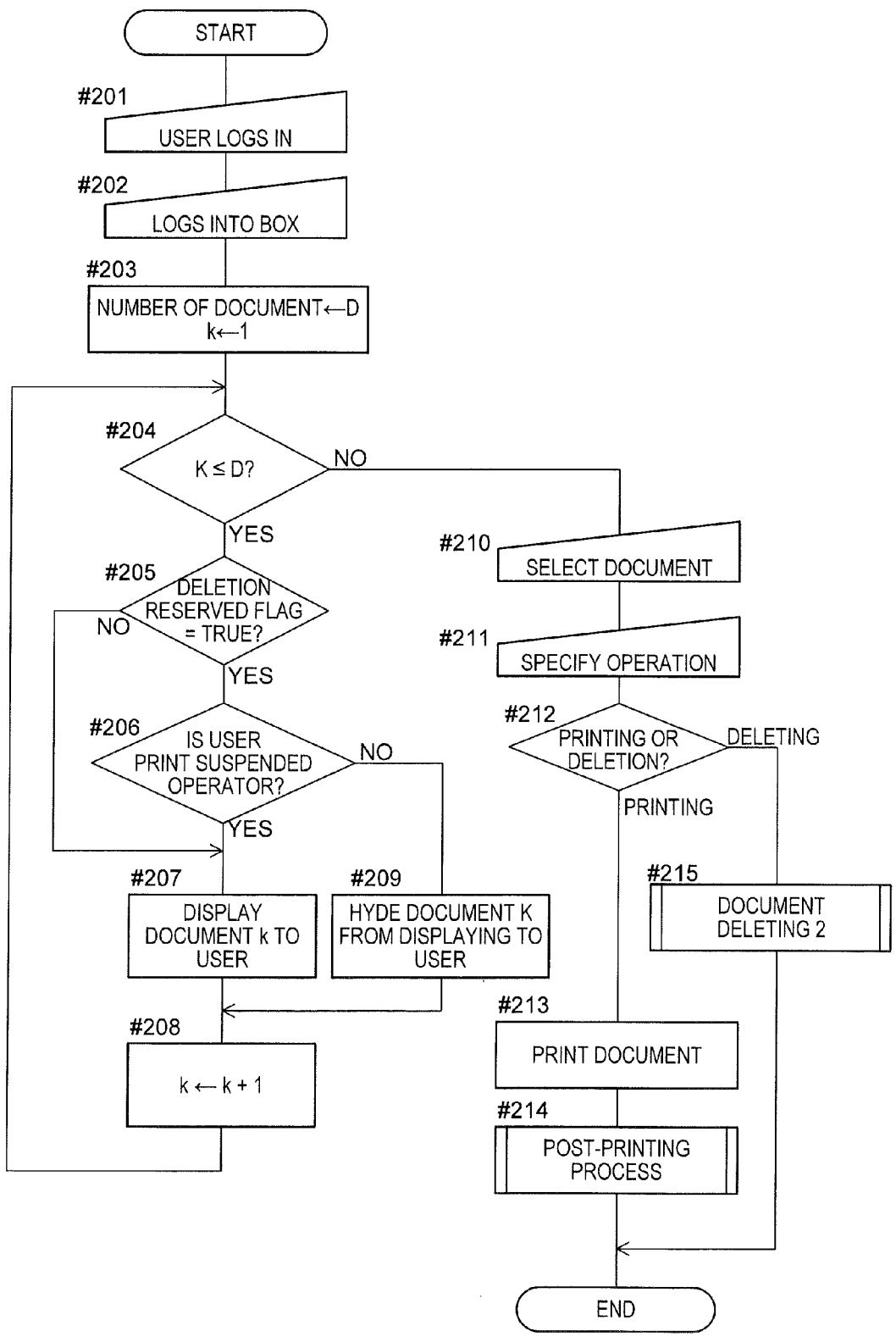
FIG. 21 is a flowchart outlining a second operation example of the multifunction device.

FIG. 21 depicts outlines of a second operation example of the multifunction device 2. When the user log-in operation and the box log-in operation are performed sequentially (#201, #202), the document management portion 38 checks the number of documents D in the log-in box and sets a value of a counter k that counts the number of processed documents to a default value of "1" (#203). Then, the document management portion 38 repeats a series of processes of controlling displaying each document and incrementing the value of the counter k until the value of the counter k becomes higher than the number of documents D (#204-#209). To be specific, the document management portion 38 checks a deletion reserved flag for the k-th document (#205) and displays the k-th document (#207) as a candidate for specifying it as a document to be processed if the deletion reserved flag is set to "TRUE" and, at the same time, the log-in user is the print suspended operator of the k-th document (#206). In contrast, if the log-in user is not the print suspended operator, the document management portion 38 does not display the k-th document as a candidate (#209). This means that the log-in user is not allowed to specify the k-th document as a document to be processed.

The deletion reserved flag is data under an item 69 which is managed together with the print management information 70 and the edit management information 75 in the document management table T2b illustrated in FIG. 22. The deletion reserved flag is set when delete operation instructions are provided to the multifunction device 2 as described later. For those documents to which the deletion reserved flag is set, reprinting by the print suspended operator is not prohibited. However, printing and editing by a user other than the print suspended operator are prohibited.

When display or non-display of the entire documents stored in the box into which the user logs is completed (#204), the multifunction device 2 receives designation of a document to be processed (selection of a document) and designation of job (#201, #211) by the log-in user. If the designation involves printing, the multifunction device 2 executes the document printing routine and a post-printing process routine sequentially (#212-#214). If the designation involves deletion, the multifunction device 2 executes a document deletion 2 routine (#212, #215). The details of the document printing routine in step #213 are the same as the details of the document printing routine in step #8 depicted in FIG. 7.

Figure 23:
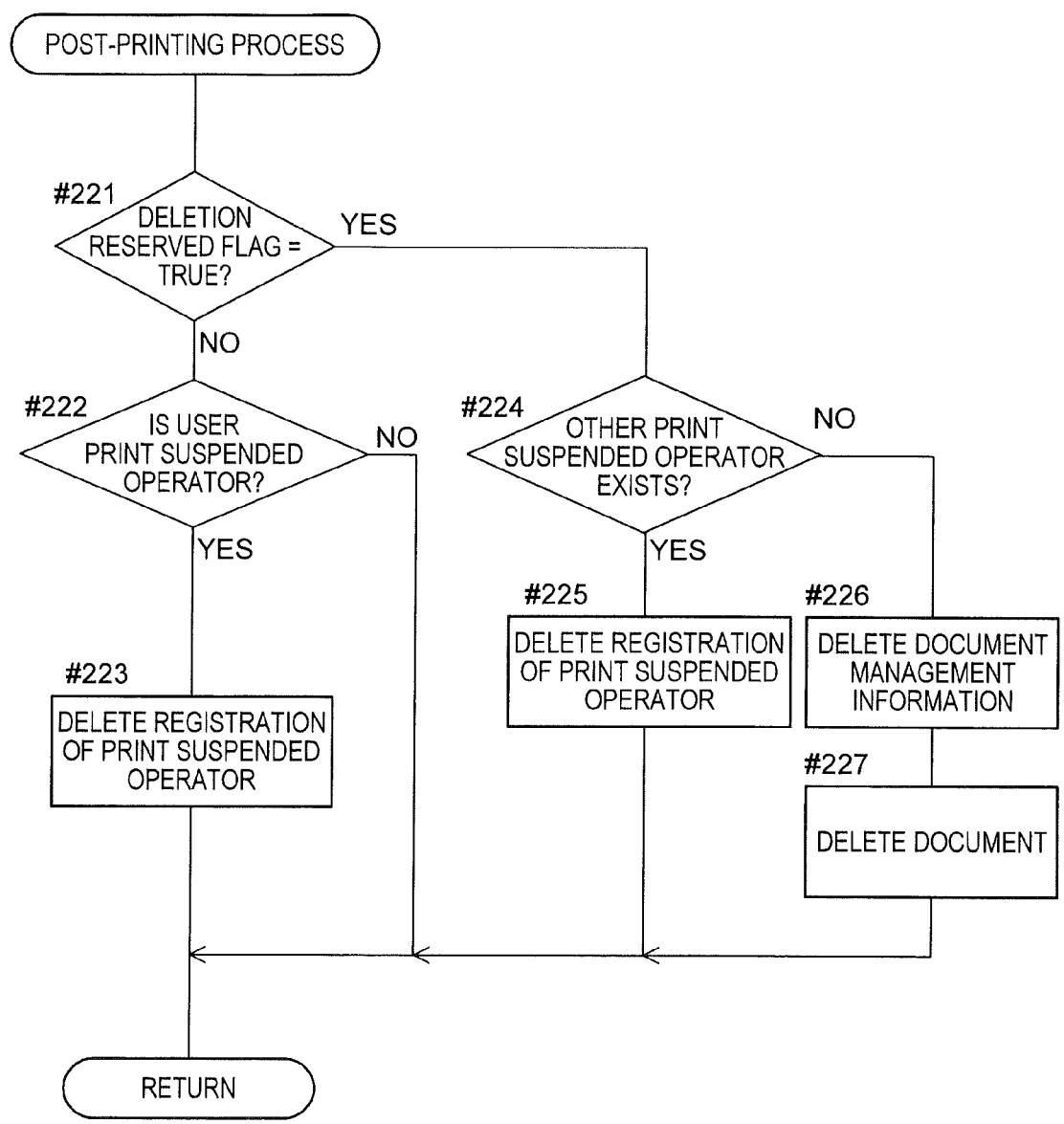
FIG. 23 is a flowchart of a post-printing process routine depicted in FIG. 21.

FIG. 23 depicts the details of the post-printing process routine in step #214 depicted in FIG. 21. If the deletion reserved flag is not set and at the same time the log-in user coincides with the print suspended operator, the document management portion 38 deletes, as the post-printing process, the registration of the print suspended operator corresponding to the log-in user for the document to be processed (#221-#223). If the deletion reserved flag is set and at the same time a print suspended operator who does not coincide with the log-in user for the document to be processed, the document management portion 38 deletes the registration of the print suspended operator corresponding to the log-in user for the document to be processed (#224, #225). If a print suspended operator who does not correspond to the log-in user is not registered, the document management portion 38 deletes the management information of the document to be processed and the document to be processed itself in the box (#224, #226-#227).

Figure 24:
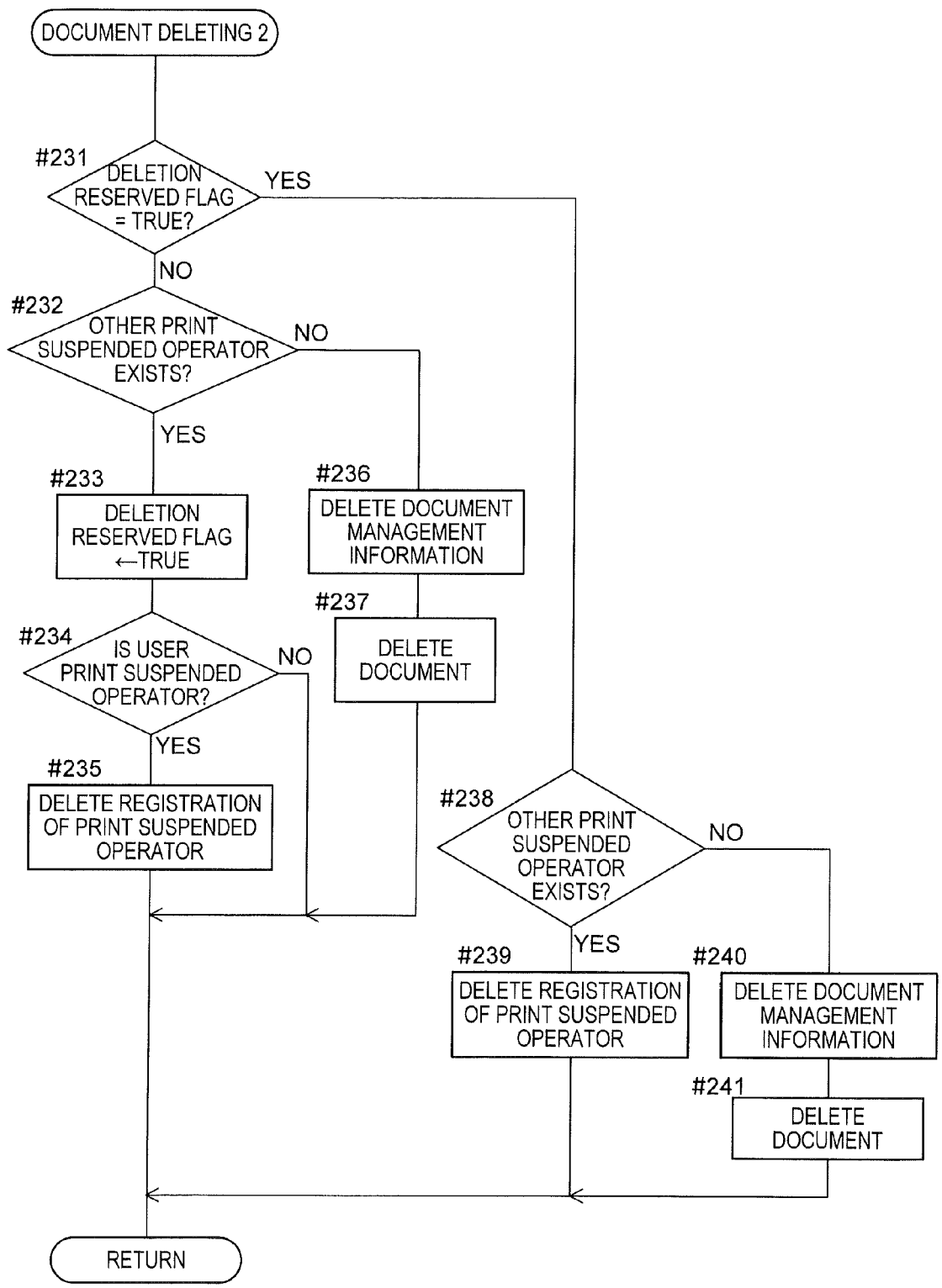
FIG. 24 is a flowchart of a document deletion 2 routine depicted in FIG. 21.

FIG. 24 depicts the details of the document deletion 2 routine in step #215 depicted in FIG. 21. If the deletion reserved flag is not set to "TRUE" and at the same time a print suspended operator who is not the log-in user is registered for the document to be processed, the deletion reserved flag is set to "TRUE" (#231-#233). This means that the deletion of the document to be processed is put on hold at this moment. Thereafter, if the log-in user is the print suspended operator, the registration of the print suspended operator corresponding to the log-in user is deleted (#234, #235). In contrast, if the print suspended operator who is not the log-in user is not registered, the management information of the document to be processed and the document itself in the box are deleted (#232, #236-#237).

If the deletion reserved flag is set and at the same time a print suspended operator who is not the log-in user for the document to be processed is recorded, the registration of the print suspended operator corresponding to the log-in user is deleted (#238, #239). If the print suspended operator who is not the log-in user is not registered, the management information of the document to be processed and the document itself in the box are deleted (#238, #240-#241).

According to the embodiment described above, it is possible to provide an image forming apparatus that, when a document is printed, automatically selects pages to be printed in accordance with whether printing was suspended or not and whether the document has been edited thereafter.

According to the embodiment described above, if a user who is not the print suspended operator of the print suspended document attempts to delete the document, such deletion is prohibited, or such deletion will be held until an elapsed time reaches a reference time. With this arrangement, it is possible to reduce occurrence of such an instance in which a document has been already deleted when a print suspended operator tries to reprint the document, i.e., a case in which unprinted pages can not be printed. This means that, even if a user suspends printing, the user can print unprinted pages without involving complicated operation.

In the embodiment described above, it is possible to sort and eject the sheets of paper on which the printed and edited pages are printed and the sheets of paper on which unprinted pages are printed into different discharge trays or into different positions in an identical discharge tray. By arranging the ejection of paper in this way, it is possible to alleviate a work load required for sorting the printed sheets of paper.

It is possible to provide a wasteful sheets calculation portion that counts the number of overlapping pages between pages printed before suspension and pages reprinted after suspension when either one of the entire page printing mode and the edited page onward printing mode is selected, and also provide a mode selection portion that selects one mode from among the entire page printing mode, the edited page onward printing mode, and the edited page printing mode according to a difference between the number of overlapping pages and a threshold value. These portions can be implemented by an appropriate program and the CPU 252 that executes such a program.

While the embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus that includes a storage area for storing a document therein, and prints and edits the document stored in the storage area, the image forming apparatus comprising:
a user identification portion that identifies a user who operates the image forming apparatus;
a print management portion that, when abort operation for giving instructions to suspend printing is performed while the document is being printed, records print management information indicating unprinted pages, and a user who performs the abort operation and is identified by the user identification portion;
an edit management portion that, when the document is updated according to edit operation, records edit management information indicating an updated page;
a determination portion that determines, based on the print management information, whether or not the user who is identified by the user identification portion is a print suspended operator who has performed the abort operation previously;
a page extraction portion that, when the print suspended operator performs reprinting operation for giving instructions to print the document that has been updated, refers to the print management information and the edit management information and extracts pages of the document which were printed successfully when printing of the document was suspended and, at the same time, which have been updated thereafter; and
a print controller that controls the image forming apparatus such that the image forming apparatus prints, in response to the reprinting operation, only unprinted pages of the document and the pages extracted by the page extraction portion,
wherein the edit operation comprises altering data of a page of the document.

2. The image forming apparatus according to claim 1,
wherein the print controller controls the image forming apparatus such that the image forming apparatus prints a smallest-numbered-page and pages onward therefrom, the smallest-numbered-page being a page having a smallest page number among the unprinted pages of the document and the pages extracted by the page extraction portion.

3. The image forming apparatus according to claim 1,
wherein the edit management portion records, as a part of the edit management information, whether there is a change in a total number of pages of the document as a result of updating the document, and
the print controller causes the image forming apparatus to print all pages of the document of which printing was suspended and which has been updated thereafter if printing of a symbol indicating the total number of pages is specified and, at the same time, there is the change in the total number of pages.

4. The image forming apparatus according to claim 1, further comprising an edit information display portion that displays information indicating the pages extracted by the page extraction portion when the print suspended operator specifies the document as a target for operation.

5. The image forming apparatus according to claim 1, further comprising a suspension information display portion that, if the user identified by the user identification portion is the print suspended operator, displays information indicating presence of the document of which printing was suspended by the print suspended operator.

6. The image forming apparatus according to claim 1, further comprising a notification portion that, in response to deletion operation performed by a user for giving instructions to delete the document, refers to the print management information and, if the print suspended operator is found for the document, notifies the user who performed the deletion operation of a fact that the print suspended operator is found for the document.

7. The image forming apparatus according to claim 1, further comprising a document management portion that, in response to deletion operation performed by a user for giving instructions to delete the document, refers to the print management information and, if the print suspended operator is found for the document, performs deletion reservation settings by which access to the document is limited to the print suspended operator,
wherein the document management portion deletes the document after printing that corresponds to the reprinting operation involving the document as a target to be printed has been successfully completed.

8. The image forming apparatus according to claim 1, wherein, when the abort operation is performed, the print management portion records an aborted time as a part of the print management information, and the print management portion deletes the document if deletion operation for giving instructions to delete the document is performed after a predetermined period of time or longer has elapsed since the aborted time.

9. A non-transitory computer-readable storage medium storing thereon a computer program used in a computer included in an image forming apparatus having a function to print and edit a document stored in a storage area for storing documents, the computer program causing the computer to perform:

a user identification step that identifies a user who operates the image forming apparatus;

a print management step that, when abort operation for giving instructions to suspend printing is performed while the document is being printed, records print management information indicating unprinted pages and a user who performs the abort operation and is identified in the user identification step;

an edit management step that, when the document is updated according to edit operation, records edit management information indicating an updated page;

a determination step that determines, based on the print management information, whether or not the user who is identified in the user identification step is a print suspended operator who has performed the abort operation previously;

a page extraction step that, when the print suspended operator performs reprinting operation for giving instructions to print the document that has been updated, refers to the print management information and the edit management information, and extracts pages of the document which were printed successfully when printing of the document was suspended and, at the same time, which have been updated thereafter; and a print controlling step that controls the image forming apparatus such that the image forming apparatus prints, in response to the reprinting operation, only unprinted pages of the document and the pages extracted in the page extraction step, wherein the edit operation comprises altering data of a page of the document.

10. The non-transitory computer-readable storage medium according to claim 9, wherein the print controlling step controls the image forming apparatus such that the image forming apparatus prints a smallest-numbered-page and pages onward therefrom, the smallest-numbered-page being a page having a smallest page number among the unprinted pages of the document and the pages extracted in the page extraction step.

11. The non-transitory computer-readable storage medium according to claim 9, wherein the edit management step records, as a part of the edit management information, whether there is a change in a total number of pages of the document as a result of updating the document, and the print controlling step causes the image forming apparatus to print all pages of the document of which printing was suspended and which has been updated thereafter if printing of a symbol indicating the total number of pages is specified and, at the same time, there is the change in the total number of pages.

12. The non-transitory computer-readable storage medium according to claim 9, wherein the computer program causes the computer to further perform an edit information display step that displays information indicating the pages extracted in the page extraction step when the print suspended operator specifies the document as a target for operation.

13. The non-transitory computer-readable storage medium according to claim 9, wherein the computer program causes the computer to further perform a suspension information display step that, if the user identified in the user identification step is the print suspended operator, displays information indicating presence of the document of which printing was suspended by the print suspended operator.

14. The non-transitory computer-readable storage medium according to claim 9, wherein the computer program causes the computer to further perform a notification step that, in response to deletion operation performed by a user for giving instructions to delete the document, refers to the print management information and, if the print suspended operator is found for the document, notifies the user who performed the deletion operation of a fact that the print suspended operator is found for the document.

15. The non-transitory computer-readable storage medium according to claim 9, wherein the computer program causes the computer to further perform a document management step that, in response to deletion operation performed by a user for giving instructions to delete the document, refers to the print management information and, if the print suspended operator is found for the document, performs deletion reservation settings by which access to the document is limited to the print suspended operator and deletes the document after printing that corresponds to the reprinting operation involving the document as a target to be printed has been successfully completed.

16. The non-transitory computer-readable storage medium according to claim 9, wherein, when the abort operation is performed, the computer program causes the computer to perform recording an aborted time as a part of the print management information in the print management step, and to perform a step of deleting the document if deletion operation for giving instructions to delete the document is performed after a predetermined period of time or longer has elapsed since the aborted time.

* * * * *